US007827056B2

(12) United States Patent
Walker et al.

(10) Patent No.: US 7,827,056 B2
(45) Date of Patent: *Nov. 2, 2010

(54) METHOD AND APPARATUS FOR FACILITATING ELECTRONIC COMMERCE THROUGH PROVIDING CROSS-BENEFITS DURING A TRANSACTION

(75) Inventors: Jay S. Walker, Ridgefield, CT (US); Daniel E. Tedesco, New Canaan, CT (US); John M. Packes, Jr., Stamford, CT (US); James A. Jorasch, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/423,481

(22) Filed: Jun. 12, 2006

(65) Prior Publication Data

US 2006/0218049 A1  Sep. 28, 2006

Related U.S. Application Data

(63) Continuation of application No. 09/219,267, filed on Dec. 23, 1998, which is a continuation-in-part of application No. 08/943,483, filed on Oct. 3, 1997, now abandoned, which is a continuation-in-part of application No. 08/923,683, filed on Sep. 4, 1997, now Pat. No. 6,553,346, which is a continuation-in-part of application No. 08/889,319, filed on Jul. 8, 1997, now Pat. No. 6,085,169, which is a continuation-in-part of application No. 08/707,660, filed on Sep. 5, 1996, now Pat. No. 5,794,207, application No. 09/219,267, which is a continuation-in-part of application No. 09/100,684, filed on Jun. 19, 1998, now Pat. No. 6,196,458, which is a continuation-in-part of application No. 08/982,149, filed on Dec. 1, 1997, now Pat. No. 6,196,458, application No. 09/219,267, which is a continuation-in-part of application No. 08/994,426, filed on Dec. 19, 1997, now Pat. No. 6,694,300, which is a continuation-in-part of application No. 08/920,116, filed on Aug. 26, 1997, now Pat. No. 6,119,099, which is a continuation-in-part of application No. 08/822,709, filed on Mar. 21, 1997, now Pat. No. 6,267,670.

(51) Int. Cl.
*G06Q 30/00* (2006.01)

(52) U.S. Cl. ............... 705/14.23; 705/14.1; 705/14.11; 705/14.34; 705/14.36; 705/14.38; 705/14.39; 705/26; 705/300

(58) Field of Classification Search ............ 705/14, 705/14.1, 14.11, 14.23, 14.34, 14.36, 14.38, 705/14.39, 26, 300
See application file for complete search history.

(56) References Cited

U.S. PATENT DOCUMENTS

| | | |
|---|---|---|
| 3,573,747 A | 4/1971 | Adams et al. |
| 4,108,361 A | 8/1978 | Krause |
| 4,247,759 A | 1/1981 | Yuris et al. |
| 4,323,770 A | 4/1982 | Dieulot et al. |
| 4,449,186 A | 5/1984 | Kelly et al. |
| 4,484,733 A | 11/1984 | Loos et al. |
| 4,491,725 A | 1/1985 | Pritchard |
| 4,494,197 A | 1/1985 | Troy et al. |
| 4,500,880 A | 2/1985 | Gomersall et al. |
| 4,553,222 A | 11/1985 | Kurland et al. |
| 4,667,292 A | 5/1987 | Mohlenbrock et al. |
| 4,669,730 A | 6/1987 | Small |
| 4,677,553 A | 6/1987 | Roberts et al. |
| 4,689,742 A | 8/1987 | Troy et al. |
| 4,723,212 A | 2/1988 | Mindrum et al. |
| 4,750,119 A | 6/1988 | Cohen et al. |
| 4,751,728 A | 6/1988 | Treat |
| 4,760,247 A | 7/1988 | Keane et al. |
| 4,789,928 A | 12/1988 | Fujisaki |
| 4,799,156 A | 1/1989 | Shavit et al. |
| 4,815,741 A | 3/1989 | Small |
| 4,833,308 A | 5/1989 | Humble |
| 4,839,507 A | 6/1989 | May |
| 4,854,590 A | 8/1989 | Jolliff et al. |
| 4,859,838 A | 8/1989 | Okiharu |
| 4,876,592 A | 10/1989 | Von Kohorn |

| Patent No. | Date | Inventor |
|---|---|---|
| 4,882,473 A | 11/1989 | Bergeron et al. |
| 4,902,880 A | 2/1990 | Garczynski et al. |
| 4,903,201 A | 2/1990 | Wagner |
| 4,908,761 A | 3/1990 | Tai |
| 4,910,672 A | 3/1990 | Off et al. |
| 4,922,522 A | 5/1990 | Scanlon |
| 4,937,853 A | 6/1990 | Brule et al. |
| 4,973,952 A | 11/1990 | Malec et al. |
| 4,982,337 A | 1/1991 | Burr et al. |
| 4,982,346 A | 1/1991 | Girouard et al. |
| 4,993,714 A | 2/1991 | Golightly |
| 5,003,384 A | 3/1991 | Durden et al. |
| 5,021,953 A | 6/1991 | Webber |
| 5,025,372 A | 6/1991 | Burton et al. |
| 5,056,019 A | 10/1991 | Schultz et al. |
| 5,060,165 A | 10/1991 | Schumacher et al. |
| 5,119,295 A | 6/1992 | Kapur |
| 5,128,862 A | 7/1992 | Mueller |
| 5,132,914 A | 7/1992 | Cahlander et al. |
| 5,136,501 A | 8/1992 | Silverman et al. |
| 5,168,446 A | 12/1992 | Wiseman |
| 5,172,328 A | 12/1992 | Cahlander et al. |
| 5,173,851 A | 12/1992 | Off et al. |
| 5,177,342 A | 1/1993 | Adams |
| 5,189,607 A | 2/1993 | Shirasaki et al. |
| 5,191,613 A | 3/1993 | Graziano et al. |
| 5,192,854 A | 3/1993 | Counts |
| 5,200,889 A | 4/1993 | Mori |
| 5,201,010 A | 4/1993 | Deaton et al. |
| 5,202,826 A | 4/1993 | McCarthy |
| 5,216,595 A | 6/1993 | Protheroe |
| 5,223,698 A | 6/1993 | Kapur |
| 5,224,034 A | 6/1993 | Katz et al. |
| 5,231,569 A | 7/1993 | Myatt et al. |
| 5,239,165 A | 8/1993 | Novak |
| RE34,380 E | 9/1993 | Sleevi |
| 5,243,515 A | 9/1993 | Lee |
| 5,245,533 A | 9/1993 | Marshall |
| 5,256,863 A | 10/1993 | Ferguson et al. |
| 5,262,941 A | 11/1993 | Saldin et al. |
| 5,274,547 A | 12/1993 | Zoffel et al. |
| 5,283,731 A | 2/1994 | Lalonde et al. |
| 5,287,268 A | 2/1994 | McCarthy |
| 5,297,026 A | 3/1994 | Hoffman |
| 5,297,031 A | 3/1994 | Gutterman et al. |
| 5,302,811 A | 4/1994 | Fukatsu |
| 5,305,195 A | 4/1994 | Murphy |
| 5,309,355 A | 5/1994 | Lockwood |
| 5,315,093 A | 5/1994 | Stewart |
| 5,319,542 A | 6/1994 | King et al. |
| 5,329,589 A | 7/1994 | Fraser et al. |
| 5,333,186 A | 7/1994 | Gupta |
| 5,353,218 A | 10/1994 | De Lapa et al. |
| 5,353,219 A | 10/1994 | Mueller et al. |
| 5,361,199 A | 11/1994 | Shoquist et al. |
| 5,367,450 A | 11/1994 | Pintsov |
| 5,371,796 A | 12/1994 | Avarne |
| 5,380,991 A | 1/1995 | Valencia et al. |
| RE34,915 E | 4/1995 | Nichtberger et al. |
| 5,404,291 A | 4/1995 | Kerr et al. |
| RE34,954 E | 5/1995 | Haber et al. |
| 5,420,606 A | 5/1995 | Begum et al. |
| 5,420,914 A | 5/1995 | Blumhardt |
| 5,426,281 A | 6/1995 | Abecassis |
| 5,434,394 A | 7/1995 | Roach et al. |
| 5,444,630 A | 8/1995 | Dlugos |
| 5,450,938 A | 9/1995 | Rademacher |
| 5,459,306 A | 10/1995 | Stein et al. |
| 5,467,269 A | 11/1995 | Flaten |
| 5,481,094 A | 1/1996 | Suda |
| 5,504,475 A | 4/1996 | Houdou et al. |
| 5,510,979 A | 4/1996 | Moderi et al. |
| 5,515,270 A | 5/1996 | Weinblatt |
| 5,517,555 A | 5/1996 | Amadon et al. |
| 5,519,769 A | 5/1996 | Weinberger et al. |
| 5,523,794 A | 6/1996 | Mankovitz et al. |
| 5,537,314 A | 7/1996 | Kanter |
| 5,539,189 A | 7/1996 | Wilson |
| 5,553,131 A | 9/1996 | Minervino, Jr. et al. |
| 5,557,518 A | 9/1996 | Rosen |
| 5,564,546 A | 10/1996 | Molbak et al. |
| 5,570,417 A | 10/1996 | Byers |
| 5,572,653 A | 11/1996 | DeTemple et al. |
| 5,581,064 A | 12/1996 | Riley et al. |
| 5,592,375 A | 1/1997 | Salmon et al. |
| 5,592,376 A | 1/1997 | Hodroff |
| 5,602,377 A | 2/1997 | Beller et al. |
| 5,606,602 A | 2/1997 | Johnson et al. |
| 5,611,052 A | 3/1997 | Dykstra et al. |
| 5,612,868 A | 3/1997 | Off et al. |
| 5,615,269 A | 3/1997 | Micali |
| 5,619,558 A | 4/1997 | Jheeta |
| 5,620,079 A | 4/1997 | Molbak |
| 5,621,201 A | 4/1997 | Langhans et al. |
| 5,621,640 A | 4/1997 | Burke |
| 5,621,812 A | 4/1997 | Deaton et al. |
| 5,632,010 A | 5/1997 | Briechle et al. |
| 5,636,346 A | 6/1997 | Saxe |
| 5,638,457 A | 6/1997 | Deaton et al. |
| 5,642,279 A | 6/1997 | Bloomberg et al. |
| 5,642,484 A | 6/1997 | Harrison, III et al. |
| 5,642,485 A | 6/1997 | Deaton et al. |
| 5,644,723 A | 7/1997 | Deaton et al. |
| 5,649,114 A | 7/1997 | Deaton et al. |
| 5,652,421 A | 7/1997 | Veeneman et al. |
| 5,652,784 A | 7/1997 | Blen et al. |
| 5,655,007 A | 8/1997 | McAllister |
| 5,655,089 A | 8/1997 | Bucci |
| 5,664,115 A | 9/1997 | Fraser |
| 5,665,953 A | 9/1997 | Mazzamuto et al. |
| 5,666,649 A | 9/1997 | Dent |
| 5,673,317 A | 9/1997 | Cooper |
| 5,684,965 A | 11/1997 | Pickering |
| 5,687,322 A | 11/1997 | Deaton et al. |
| 5,689,100 A | 11/1997 | Carrithers et al. |
| 5,689,652 A | 11/1997 | Lupien et al. |
| 5,694,551 A | 12/1997 | Doyle et al. |
| 5,708,782 A | 1/1998 | Larson et al. |
| 5,710,884 A | 1/1998 | Dedrick |
| 5,710,887 A * | 1/1998 | Chelliah et al. ............... 705/26 |
| 5,715,402 A | 2/1998 | Popolo |
| 5,717,860 A | 2/1998 | Graber et al. |
| 5,717,866 A | 2/1998 | Naftzger |
| 5,721,827 A | 2/1998 | Logan et al. |
| 5,724,521 A | 3/1998 | Dedrick |
| 5,724,525 A | 3/1998 | Beyers, II et al. |
| 5,724,886 A | 3/1998 | Ewald et al. |
| 5,727,153 A | 3/1998 | Powell |
| 5,729,693 A | 3/1998 | Holda-Fleck |
| 5,732,400 A | 3/1998 | Mandler et al. |
| 5,734,838 A | 3/1998 | Robinson et al. |
| 5,734,890 A | 3/1998 | Case et al. |
| 5,745,882 A | 4/1998 | Bixler et al. |
| 5,752,238 A | 5/1998 | Dedrick |
| 5,758,328 A | 5/1998 | Giovannoli |
| 5,759,101 A | 6/1998 | Von Kohorn |
| 5,761,647 A | 6/1998 | Boushy |
| 5,761,648 A | 6/1998 | Golden et al. |
| 5,774,868 A | 6/1998 | Cragun et al. |
| 5,774,869 A | 6/1998 | Toader |
| 5,794,207 A | 8/1998 | Walker et al. |
| 5,794,210 A | 8/1998 | Goldhaber et al. |
| 5,794,219 A | 8/1998 | Brown |
| 5,794,220 A | 8/1998 | Hunt |
| 5,794,221 A | 8/1998 | Egendorf |
| 5,806,044 A | 9/1998 | Powell |

| | | | |
|---|---|---|---|
| 5,806,045 A | 9/1998 | Biorge et al. | |
| 5,809,144 A | 9/1998 | Sirbu et al. | |
| 5,812,769 A | 9/1998 | Graber et al. | |
| 5,819,092 A | 10/1998 | Ferguson et al. | |
| 5,819,241 A | 10/1998 | Reiter | |
| 5,822,736 A | 10/1998 | Hartman et al. | |
| 5,825,881 A | 10/1998 | Colvin, Sr. | |
| 5,826,244 A | 10/1998 | Huberman | |
| 5,832,457 A | 11/1998 | O'Brien et al. | |
| 5,835,896 A | 11/1998 | Fisher et al. | |
| 5,839,119 A | 11/1998 | Krsul et al. | |
| 5,845,259 A | 12/1998 | West et al. | |
| 5,845,265 A | 12/1998 | Woolston | |
| 5,848,396 A | 12/1998 | Gerace | |
| 5,855,008 A | 12/1998 | Goldhaber et al. | |
| 5,857,175 A | 1/1999 | Day et al. | |
| 5,864,757 A | 1/1999 | Parker | |
| 5,864,822 A | 1/1999 | Baker, III | |
| 5,870,030 A | 2/1999 | DeLuca et al. | |
| 5,873,068 A | 2/1999 | Beaumont et al. | |
| 5,873,069 A | 2/1999 | Reuhl et al. | |
| 5,884,292 A | 3/1999 | Baker et al. | |
| 5,890,135 A | 3/1999 | Powell | |
| 5,890,718 A | 4/1999 | Byon | |
| 5,893,075 A | 4/1999 | Plainfield et al. | |
| 5,918,211 A * | 6/1999 | Sloane | 705/16 |
| 5,923,016 A | 7/1999 | Fredregill et al. | |
| 5,937,037 A | 8/1999 | Kamel et al. | |
| 5,946,665 A | 8/1999 | Suzuki et al. | |
| 5,970,469 A | 10/1999 | Scroggie et al. | |
| 6,014,634 A | 1/2000 | Scroggie et al. | |
| 6,026,370 A | 2/2000 | Jermyn | |
| 6,035,281 A | 3/2000 | Crosskey et al. | |
| 6,049,778 A | 4/2000 | Walker et al. | |
| 6,052,730 A | 4/2000 | Felciano | |
| 6,055,513 A | 4/2000 | Katz et al. | |
| 6,059,142 A | 5/2000 | Wittern, Jr. et al. | |
| 6,064,987 A | 5/2000 | Walker et al. | |
| 6,076,068 A | 6/2000 | DeLapa et al. | |
| 6,076,069 A | 6/2000 | Laor | |
| 6,124,799 A | 9/2000 | Parker | |
| 6,138,105 A | 10/2000 | Walker et al. | |
| 6,144,948 A | 11/2000 | Walker et al. | |
| 6,173,274 B1 | 1/2001 | Ryan, Jr. | |
| 6,178,411 B1 | 1/2001 | Reiter | |
| 6,185,545 B1 | 2/2001 | Resnick et al. | |
| 6,223,163 B1 | 4/2001 | Van Luchene | |
| 6,259,908 B1 | 7/2001 | Austin | |
| 6,298,329 B1 | 10/2001 | Walker et al. | |
| 6,298,331 B1 | 10/2001 | Walker et al. | |
| 6,327,580 B1 | 12/2001 | Pierce et al. | |
| 6,332,128 B1 | 12/2001 | Nicholson | |
| 6,336,095 B1 | 1/2002 | Rosen | |
| 6,336,099 B1 | 1/2002 | Barnett et al. | |
| 6,349,288 B1 | 2/2002 | Barber | |
| 6,393,407 B1 | 5/2002 | Middleton et al. | |
| 6,405,174 B1 | 6/2002 | Walker et al. | |
| 6,456,981 B1 | 9/2002 | Dejaeger et al. | |
| 6,965,870 B1 | 11/2005 | Petras et al. | |
| 7,225,142 B1 | 5/2007 | Apte et al. | |
| 2001/0014868 A1 | 8/2001 | Herz et al. | |

FOREIGN PATENT DOCUMENTS

| | | |
|---|---|---|
| EP | 0 109 189 A1 | 5/1984 |
| EP | 512413 A | 11/1992 |
| EP | 0 607 686 A2 | 7/1994 |
| EP | 0 902 381 A2 | 3/1999 |
| JP | 05257950 A | 10/1993 |
| JP | 10187318 A | 7/1998 |
| WO | WO 95/03570 | 2/1995 |
| WO | WO 96/31848 | 10/1996 |
| WO | WO 96/31848 A2 | 10/1996 |
| WO | WO 96/36926 | 11/1996 |
| WO | WO 97/20279 | 6/1997 |
| WO | WO 97/35441 | 9/1997 |
| WO | WO 98/06050 | 2/1998 |
| WO | WO 98/26363 | 6/1998 |
| WO | WO 98/28699 A1 | 7/1998 |
| WO | WO 98/34187 | 8/1998 |
| WO | WO 00/21400 A1 | 4/2000 |

OTHER PUBLICATIONS

Yoshihara ("New magazines try to reach Asian businesses. The fledgling English-language publications seek readers on both sides of the Pacific." Los Angeles Times. Oct. 2, 1989, p. 3.).*

Brian Reilly "Upselling strategies hit the net" Net Marketing, pp. M1 and M18, Dec. 1996.*

Affidavit of Michael D. Downs with Exhibits A-E dated Apr. 6, 2007, 19 pp.

Affidavit of Michael D. Downs with Exhibits A-C dated Apr. 6, 2007, 91 pp.

Rozen, Miriam, "What's New in Joint Promotions," The New York Times, Mar. 10, 1985, Financial Desk, Section 3, at p. 23, col. 1, 1 page.

Katcher, P. Royal, "Getting Products to Consumers; The Basics of Retailing, Part 2," Automotive Marketing, May 1990 vol. 19, No. 5 at p. 35, ISSN: 0193-3264, 5 pp.

PCT International Search Report for International Application No. PCT/US99/13409 mailed Oct. 21, 1999, 2 pp.

Cards Briefs: Stored-Value Card Designed for Casinos, Oct. 31, 1995, Copyright 1995 American Banker, Inc. (http://web.lexis-nexis.com/In.universe/s...tz &_md5=b625be0ceccfc8378819201ad83c41), Download Date Jan. 24, 1999, 1 page.

Website: "Apollo host Computer," downloaded from http//www.Apollo.com, undated, 9 pp.

Website: "The Saber Group: Welcome to Sabre Decision Technologies," downloaded from http//www.sdt.com, undated, 6 pp.

Ritter, Jeffery B., "Scope of the Uniform Commercial Code: Computer Contracting Cases and Electrical Commercial Practices," 45 Bus. Law 2533, Aug. 1990, 20 pp.

Speidel, Richard E. et al., "Impact of Electronic Contracting on Contract Formation Under Revised UCC Article 2, sales," C878 ALI-ABA 335, Dec. 9, 1993, 4 pp.

"Cyberbid", Net Fun Ltd., Homepage: www.cyberbid.com., Copyright 1995-1996, 9 pp.

Lacher, Lisa. "Coupon Gimmick Registers Profits," Business Dateline, vol. 83, No. 47, Sec. 1, Dec. 7, 1987, 2 pp.

Stevens, Lawrence. "Hypermarket Challenge," Computerworld, Software and Services section, p. 25, Dec. 19, 1988, 2 pp.

Kuttner, Robert. "Computers May Turn the World into One Big Commodities Pit," Business Week, Economic Viewpoint section, No. 3123, p. 17, Sep. 11, 1989, 2 pp.

Golden, Fran. "AAL's Riga Doubts Marketel's Appeal to Retailers; Chris Riga of American Airlines," Travel Weekly, vol. 48, No. 91, p. 4, Nov. 13, 1989, 2 pp.

Schrage, Michael. "An Experiment in Economic Theory; Labs Testing Real Markets," The Record, Business section, p. B01, Nov. 26, 1989, 3 pp.

"Safeway Introduces Store-Generated Coupons," PR Newswire, May 1, 1990, 1 page.

Del Rosso, Laura. "Marketel Says It Plans to Launch air Fare 'Auction' in June; Marketel International Inc.," Travel Weekly, vol. 50, No. 34, p. 1, Apr. 29, 1991, 3 pp.

Palline, Jeff. "Traveler's Bidding on Airline Tickets SF Firm Offers Chance for Cut-Rate Fares," The San Francisco Chronicle, News section, p. A4, Aug. 19, 1991, 3 pp.

Blattberg, Robert C. et al. "Interactive Marketing; Exploiting the Age of Addressability," Sloan Management Review, vol. 33, No. 1, p. 5, Sep. 22, 1991, 15 pp.

Del Rosso, Laura. "Ticket-Bidding Firm Closes Its Doors; Marketel International," Travel Weekly, vol. 51, No. 21, p. 1, Mar. 12, 1992, 2 pp.

McDowell, Bill. "Frequency Marketing Builds Repeat Business," Building Home supply Centers, No. 2, vol. 165, p. 96, Aug. 1993, 5 pp.

McKinney, Jeff. "Merchant Program Could Pay Off Provident," The Cincinnati Enquirer, Financial section, p. E02, Mar. 24, 1996, 2 pp.

Wagner, Jim. "Cameras Tell Mall What Door You Use, How Often You Go," Albuquerque Tribune, Evening section, p. A3, Aug. 9, 1996, 2 pp.

Fickenscher, Lisa. "AMEX to Start Free Rewards Program with Discounts on Merchandise," The American Banker, Credit/Debit/ATMs section, p. 10, Oct. 18, 1996, 2 pp.

Fitzgerald, Kate. "AMEX Program Moves Loyalty to Next Level: Custom Extras Finds a Medium Customers Can't Ignore: Billing Statements," Advertising age, News section, p. 2 Nov. 4, 1996, 2 pp.

Website: "Tecmark Reward Terminal," Tecmark Services, Inc., Homepage: www.tecmarkinc.com/terminal.htm, download date: Mar. 20, 1997, 1 page.

Fickenscher, Lisa. "Merchant: American Express Seeks to Mine Its Data on Cardholder Spending Patterns," The American Banker, Credit/Debt/ATMs section, p. 20, Mar. 24, 1997, 2 pp.

Kelsey, John. "Conditional Purchase Orders," $4^{th}$ ACM Conference on Computers, Apr. 1997, 8 pp.

"Dispensing the Future", Electronic Payments International, Feature section, p. 12, May 1997, 5 pp.

"Industry Briefs," Card News, vol. 12, No. 11, Jun. 9, 1997, 2 pp.

Website: "The United Computer Exchange: How It All works," The United Computer Exchange Corp., www.uce.com/howitworks.html, Copyright date: 1997, download date: Apr. 10, 1998, 6 pp.

Website: "Classifieds2000: The Internet Classifieds," Classifieds 2000, Inc., Homepage: www.classifieds2000.com/cgi-cls/Display.exe?C2K+aboutus, download date: Aug. 6, 1997, 3 pp.

Brochure: "Tired of Shopping for the Best Home Loan?" Mortgage Loan Specialists, Aug. 7, 1997, 2 pp.

Website: "The Loan Process," Mortgage Loan Specialists, Homepage: www.sdtech.com/mls/process.html, download date: Aug. 7, 1997, 3 pp.

Website: "HomeShark Refinance Check," HomeShark, Inc., Homepage: www.homeshark.com/homewatch/refi/refistep1.htm, download date: Aug. 31, 1997, 6 pp.

Website: "Tradingfloor.com," Homepage: www.tradingfloor.com/info/htm, download date; Aug. 14, 1997, 11 pp.

Website: The NASDAQ Market, Inc. ("NASDAQ") Consolidated subscriber Agreement, Homepage: www.pcquote.com/exchange/ex_nasd.html, download date: Aug. 15, 1997, 5 pp.

Website: "What is NASDAQ?" Homepage: http://home/axford.com/corfin/cof11.htm, download date: Aug. 15, 1997, 3 pp.

Website: "Onsale® Auction Supersite (TM)," OnSale, Inc., Homepage: www.onsale.com/category, download date: Sep. 8, 1997, 15 pp.

Website: "About IAO (Interactive Auction Online)," Interactive Auction Online, Homepage: www.iaoauction.com/auction.htm, download date: Sep. 18, 1997, 10 pp.

Hoeschen, Brad. "Brookfield Square Hopes Mall Card Strikes a Chord," Business Journal-Milwaukee, vol. 14, No. 50, p. 19, Sep. 12, 1997, 2 pp.

Website: "NCR 7452 Workstation," NCR Corporation, Homepage: www.ncr.com/products/Catalog/7452.shtml, download date: Sep. 23, 1997, 5 pp.

Website: "Case-In-Point: Bloomindale's Inc.," Acxiom, Conway, AR., Homepage: www.acxiom.com/cip-cs-b.htm, download date: Sep. 23, 1997, 3 pp.

Website: "New Partners, More Exciting Rewards: The Membership Rewards Program for 1998," American Express Company, Homepage: www.americanexpress.com/rewards/news/docs/1998new_mr.shtml, download date: Mar. 12, 1998, 2 pp.

Brochure: "MyPoints (R)", MotivationNet, Inc. (TM), Homepage: www.mypoints.com, Copyright: Apr. 1998, 29 pp.

Hemsley, Steve. "Research and Destroy; Point-of Purchase Research Provides Brand Managers with Essential Information About Customers Trends and Enables Them to Achieve the Maximum Impact From Their Displays," Marketing week, Point of Purchase section, p. 33-36, Apr. 16, 1998, 3 pp.

Amato-Mccoy, Deena. "Co-Branded Acme Credit Card Rewards Loyal Users," Supermarket News,. p. 17, Jun. 15, 1998, 2 pp.

"Acme Markets, U.S. Bancorp Debut Visa Rewards Card," Card News, vol. 13, No. 12, Jun. 22, 1998, 1 page.

Rubinstein, Ed. "Prepaid Program Lets Galleria Guests Dine 'A La Card'," Nation's Restaurant News, p. 43, Jun. 29, 1998, 1 page.

"Datacard Partners with CSI to Offer Card-Based Loyalty Solution to Merchants", Business Wire, Jul. 9, 1998, 1 page.

Albright, Mark. "Grocery Savings Via Web Coupons," St. Petersburg Times, Business section, p. 1E, Jul. 22, 1998, 2 pp.

Brochure: "Reaching Out in New Directions: Introducing U$A Value Exchange (U$SVE)," First data Corp. Merchant Services, Undated, 32 pp.

Wedsite: "Sotheby's General Information," downloaded from http://www.sothebys.com, (1996), 2 pp.

Nimmer, Raymond T., "Electronic Contracting: Legal issues," 14 J. Marshall Computer & Infor. L. 211, Winter 1996, 25 pp.

American Law Institute, Draft-Uniform Commercial Code Article 2 (Sales), parts 2,3, and 7, Jan. 4, 1996, 24 pp.

"Cathay Pacific Online Ticket Bidding," World Internet News Digest, May 8, 1996, 1 page.

Website: "About rate Hunter," downloaded from http//www.207.49.64.77/rhprodrh.htm, on Jul. 14, 1996, 2 pp.

Website: "Phonemiser," downloaded from http://www.phonemiser.com/faq/htm, on Jul. 14, 1996, 8 pp.

Nishimoto, Lisa, "Market Analysis: Travel Services are First Online Commerce Offerings to Fly: Many Corporations Arrange Flight, Car Rental and Hotel Bookings on the Internet," InfoWorld, p. 44, Jul. 29, 1996, 2 pp.

Wedsite: "Cathy Pacific: Cybertraveler auction #3—Official Rules," downloaded from http://www.cathypacific, downloaded Jul. 30, 1996, 4 pp.

Website: American Airlines Internet silent Auction, American Airlines, Inc, downloaded from http://www.Americanair.com Aug. 1996, 8 pp.

Website: "Crest: Cruise/Ferry Revenue Management System," Revenue Technology services Corporation, downloaded from http://www.rtscorp.com/h2o.htm, Aug. 5, 1996, 5 pp.

"World's First Real-Time Travel Auction Service to be Available Via World Wide Web," Business Wire, Nov. 4, 1996, 2 pp.

Website: "Web Ventures Presents Bookit!," downloaded from http://www.webventure.com/bookit/, Dec. 2, 1996, 2 pp.

"UK's World Telecom Unveils New Worldsaver Tariffs," Newsbytes, Feb. 13, 1997, 1 page.

Website: "Frequently Asked Questions About: Airhitch," downloaded from http://www.isicom.fr/airhitch/ahfaq, May 6, 1997, 5 pp.

Website: Airhitch Your way to Low Cost Travel, downloaded from http://www.vaportrails.com/Budget/Budfeatures/Airhitch/Airhitch.html, May 6, 1997, 2 pp.

Website: Hitch a Flight to Europe, downloaded from http://www.travelassist.com/mag/a69.html, May 6, 1997, 1 page.

Website: "Trade-Direct: We Help You Trade with Confidence," downloaded from http://www.trade-direct.com/, Aug. 6, 1997, 2 pp.

Opensite Technologies, Inc., Brochure copyright date 1998, 8 pp.

Website: "CSM Online: Collector's Super CSM Mall," downloaded from http://www.csmonline.com/help/aboutcsm.html Apr. 23, 1998, 4 pp.

Website: "Netis: Auction Web," downloaded from http://www.auctionweb.com Oct. 13, 1998, 9 pp.

Website: "DealDeal>com:Bid to Win," downloaded from http://dealdeal.com/pxcfm/bidandwin.cfm?classID=elc&cid=&cal, Oct. 29, 1998.

Mandesse, Joe, "Interactive Puts Radio at Crossroads; Out-of Home Role, Tapping into Digital Tech Could Ensure Future," Advertising Age, News, Oct. 25, 1993 at p. 12, 4 pp.

Ellis, Stephen, "Credit Card firms Drive Down Costs," Sunday Times Features section, Feb. 27, 1994, 4 pp.

Patch, Kimberly, "Sled InterNIC Debut Internet Services; Sled Corp Offers Electronic Coupons for Encryption software; InteNIC Information Services Launches InfoGuide to Internet Computer Network" PC Week, May 16, 1994 vol. 11 No. 19 at p. 130, ISSN: 0740-1604, 1 page.

Ratcliffe, Mitch, "Lucie; Interactive Environment," Information, Advertising stands Upright, Prepares to Walk; Information Presentation Technologies Inc.'s Local Use consumer Interactive Environment, Digital Media, Jun. 8, 1994, No. 1, vol. 4 at p. 14, ISSN: 1056-7038, 4 pp.

Armstrong, Larry. "Coupon Clippers, save Your Scissors," Vons Supermarkets are Revolutionizing the Delivery of Discounts. Business week, Jun. 20, 1994, No. 3377 at p. 164, 2 pp.

Bowles, Bob and Andreasen, Lois, "ADSI: Maximizing the Synergy Between the Network and Terminals; Analog display Services Interface," Telephony, Aug. 19, 1994, vol. 227, No. 9 at p. 20, ISSN: 0040-2656, 4 pp.

Radcliffe, Mitch. "All Roads Lead to Microsoft's Windows Everywhere Strategy," Digital Media, Mar. 6, 1995, No. 10, vol. 4 at p. 3, ISSN: 1056-7038, 11 pp.

Various Communications-Related Articles in Communications Daily, May 15, 1996, vol. 16, No. 95 at p. 4, 3 pp.

Nolle, Tom, "Overcoming Cellular Déjà vu; Personal Communications Services," America's Network, Sep. 15, 1996, No. 18, vol. 100 at p. 70, ISSN: 1075-5292.

Meece, Mickey. "Mastercard, Retailers Testing Point of Sales Discounts Program"; Credit/Debit/ATMS, Sep. 24, 1996 at p. 14.

Battle of the Bogoff: Roderick Oram on a Clash between Retailers and Manufacturers, Financial times (London), Management, Marketing and Advertising, Oct. 24, 1996 at p. 14, 2 pp.

"At&T Wireless Adds Convenience to Buying Cellular services," M2 Communications Ltd. 1996; M2 Presswire, Pittsburgh, Nov. 20, 1996, 2 pp.

Beyer, Leslie. Target Marketing Made Easy; Supermarkets, Delta Communications Inc., Grocery Marketing, Feb. 1997 at p. 48, 3 pp.

"Emaginet Plans to Push Its Way into Consumer Mindset Pocketbook," Interactive PR and Marketing News, May 30, 1997, vol. 4 No. 22, 2 pp.

Warner, Bernhard. "Ads in the Ether on PC's Phones, Pagers (Will Consumers Accept Promo Beeps?)," Brandweek, Mar. 31, 1997 at p. 48, 3 pp.

Sinclair, Stewart. "To Mail or Not to Mail?" Strategy, Strategy Directresponse Special Report, Couponing, Oct. 12, 1998 at p. D21, 4 pp.

Dennis Sylvia. "Visa Gets ready for Interactive Set-Top Boxes," Newsbytes, Dec. 14, 1998, 2 pp.

Shermach, Kelly. "Retailers Rebuild Roots As Loyalty Pioneers," Card Marketing, Jan. 1999, vol. 3, No. 1, 2 pp.

"Northwest Airlines, Sprint Enter into Mileage Partnership; Consumers can Earn Up to 16,500 Frequent Flyer Miles Through Wide Range of Communications Services—Long Distance, Internet, Paging and Ultimately Sprint PCS," PR Newswire, Financial News, Jan. 5, 1999, 2 pp.

Free from NextCard—The Ages of Myst(TM), NextCard Promotion. (http://www.nextcard.com/ages/agesofmyst.html), download date: Jan. 6, 1999, 2 pp.

"E—Card web Page," E—Commerce Services from First USA, (http://apl.firstusa.com/pcard/index1.cfm?), download date: Jan. 11, 1999, 5 pp.

"About SaveSmart," SaveSmart.com, (http://www.savesmart.com/about/savesmart.html), down date: Jan. 12, 1999, 4 pp.

Internet/News.com staff, "The Trip.com, Visa Launch Rewards Program," (http://www.internetnews.com/ec-news/1999/01/1302-trip.html), download date: Jan. 13, 1999,2 pp.

"MySimon," my-Simon.com fact Sheet, (http://www.mysimon.com/corporate/company/factsheet.html), download date Jan. 13, 1999, 3 pp.

About ClickRewards the Best way to Earn Miles, (http://www.clickrewards.com/about.html), download date: Jan. 13, 1999, 4 pp.

"Join AOL Long Distance and This Is What You Will Receive . . . ," Jan. 13, 1999,2 pp.

"FYI; Calls Are Free After the Ads," Star Tribune, Jan. 14, 1999 at p. 1D.

"The New AE Card," American Eagle Outfitters Credit Application, Jan. 14, 1999, 6 pp.

"AltaVista's special Offer to You . . . $10 for Any CD!," Jan. 17, 1999, 1 page.

"Amazia Endeavour Travel," TS60 Eight Day Fly Drive Package, Jan. 17, 1999, 2 pp.

"Rent from NetFlix.com Buy from Amazon.com," Official Press Release, Jan. 17, 1999, 1 page.

"Sprint Sense Anytime;" Titanic on Videocassette is free when you sign up for Sprint Sense Day Long Distance, (http://csg.sprint.com/titanic), download date: Jan. 18, 1999, 1 page.

O'Brien, Timothy L., "The Market: Market Place—Taking the Danger out of Danger out of Risk; Chase says Models Helped it avoid Financial Minefields," The New York Times Business/Financial Desk, Jan. 20, 1999 Section C. col. 2 at p. 1, 4 pp.

Cox, Beth, "Visa, Travelweb Enter Online Marketing Partnership," Internetnews.com, Jan. 21, 1999, 1 page.

Ellin, Abby, "Listening to an Earful for Savings," (Hear the Pitches and talk for Free), The New York Times, Jan. 24, 1999, 1 page.

"Kiosk Issues Cards for Loyalty and Credit: Datacard, Minneapolis, Has Introduced a Line of Kiosks that Retailers Can Use to Issue Loyalty Program Cards and In-Store Charge Cards," Rtnews Feb. 1999, 1 page.

Files, Jennifer, "Grocers, At&T Team Up; "Smart" Coupon to Offer Bonus," The Dallas Morning News, Business, Feb. 6, 1999 at p. 12F, 2 pp.

Wijnen, Renee, "Listening to Ads Earns Free Long Distance; Advertisers Select Target Groups to Hear Messages," DM News, Supplement, Teleservices News, Mar. 1, 1999 at p. 1, 3 pp.

"Smart Cards; Buying Via Cable Lines," Future Banker, Future Money, Mar. 1, 1999 at p. 19, 1 page.

"CardTrak Online," ATM Ads, (www.cardweb.com/csrdtrak/news/1999/march/4a .html), 1 page.

"Wells Fargo Atms in California Becomes Little Billboards," Marketing news TM, Mar. 29, 1999 at p. 4, 2 pp.

"$20 in Free Groceries when You switch to AT&T Residential Long Distance Service. Call 1 800 288-262 AT&T," Photocopy of a Coupon Obtained from a coupon-dispensing Machine at a Safeway store May 19, 1999, 1 page.

"Planet U; Making Promotional Offers Available to U," (http://www.planetu/Pages/con-index.html), download date: May 23, 1999, 1 page.

"Five Great reasons to Enroll," (http://www.coolsavings.com/scripts/why enroll.asp?...), download date: May 23, 1999, 2 pp.

"E-Centives," (http://www.emaginet.com/de...memfaq.shtml), download date: May 23, 1999, 3 pp.

Visa—Smart Cards—About Smart cards; "What Is a smartcard?," (http://www.visa.com/nt/chip/info.html), Download date: May 23, 1999, 4 pp.

"Smart Cards for Windows;" The Smart Market Opportunity, (http://www.microsoft.com/windowsce/smartcard/start/background.asp), download date: May 23, 1999, 6 pp.

"Our Cards:Smart Cards: Using Smart Cards to deliver New Value." (http://www.mastercard/com/ourcard/smartcard/articles/artivle4.htm10, download date: Mat 23, 1999, 5 pp.

"deja.com," (http://x24.deja.../getdoc.xp?...), May 24, 1999, 7 pp.

Royal Bank is First to Offer Instant Discount Program on No-Frills, Low rate Option and Classic Visa Cards: Canada News Wire; Financial News, Jul. 2, 1999, Friday, 2 pp.

Higginbotham, Stacey, "Next, Online Bids Over Jail Time?," Business Week, Up front Section, Jul. 19, 1999, 1 page.

Armstrong, Larry, "The Free-PC Game: Lure 'Em in and Lock 'Em Up," Business Week, Information Technology, Jul. 19, 1999, 1 page.

Poletti, Therese, "Latest twist on Free PC's—Free iMacs:" Yahoo! News, technology Headlines; Aug. 3, 1999, 2 pp.

Hamilton, Doug, "Florida Museum Displays Massive JFK Collection, Going Places; News, Notes & Tips," The Atlanta Journal and Constitution, Nov. 7, 1999, Sunday Home Edition Travel at p. 4K, 3 pp.

"Multi-Pint Computing Solutions," (http://multi-point.com/au/pmc/htm), download date: Nov. 22, 1999, 2 pp.

PCT International Search Report for International Application No. PCT/US99/19955 mailed Feb. 23, 2000, 6 pp.

PCT International Written Opinion for International Application No. PCT/US99/13409 mailed May 5, 2000, 2 pp.

"#1 Online Department Store Joins Clickrewards in Time for the Holidays; Azazz.com to Supply Name-Brand Merchandise for Netcentives' Clickrewards Catalog and Clickrewards; Members can Now Earn Generous Clickmiles Promotions within the Azazz.com Internet Department Store," Nov. 27, 1998, Copyright 1998 PR Newswire Association, Inc.(http://web.lexis.nexis.com/1n.universe/s...a3&__md5=9feeb8c53a1851ab13321cd728fc293), download date: Sep. 14, 1999, 3 pp.

Miriam Kreinin Souccar. "Epidemic of Rate Shopping Spurs a Search for remedies," Jan. 7, 1999, Copyright 1999 American Banker, Inc., (http://web.lexis.nexis.com/1n.universe/s...a3&__md5=2d3eab8386c438f589062c3d5a7847aa), download date Sep. 14, 1999, 2 pp.

"Introducing the Digital MenuBoard", Siren Technologies, Inc., (www sirentech com), undated, 4 pp.

"Cape Town", Reuters, Nov. 8, 1979, 1 page.

"Save the Mark", Financial Times London, Feb. 1, 1983, Section: Section I, Men & Matters, p. 12, 1 page.

Cook, Louise, "ConsumerWatch: Clip, Snip, Save", Associated Press, Mar. 12, 1984, Section: Business News, 2 pp.

Greene, Jan, "Farm bills please assn; National Grocers Association", Supermarket News, Dec. 23, 1985, Section: vol. 35, p. 6, ISSN: 0039-5803, 1 page.

Website: "buy.com", (wysiwyg//29http//www buy com/retail/w.. Category=CELLULAR&Keyword=cellular+), copyright 1997-2003, 2 pp.

Website: "Verizon Wireless at Radio Shack", (http //www radio shack com/Partners/Verizon/VerizonLanding asp?In=ve), Copyright 2003, 3 pp.

Office Action mailed Jul. 29, 2003 for U.S. Appl. No. 09/579,215, entitled "Systems And Methods For Evaluating Information Associated With A Transaction To Determine A Subsidy Offer", filed May 26, 2000 in the name of Jay S. Walker et al, 21 pp.

Press Release of Aug. 21, 1996, "Fort Worth Outlet Square Offers American Airlines AAdvantage Miles", Tandy Corporation, Coptright 1995, 2pp.

"Examiner's Affidavit", Affidavit Apr. 11, 2003, 1 page.

Press Release of Oct. 16, 19996, "Radioshack Introduces Handheld Flip-style Cellular Telephone with Vibration Alert" Tandy Corporation, Coptright 1995, 2 pp.

Pogoda, Dianne M., "G.E.C.C. Offers Credit Card with Discounts, Rebates; General Electric Capital Corp." WWD (Woman's Wear Daily) Sep. 3, 1992, 2 pp.

"Chemical Bank and AT&T Smart Cards form Strategic Alliance", www.att.com/press/1193/931117.b1b.html, 3 pp.

Kristof, Kathy "Card Sharks are in Season; be Wary of Discounts and Rebates as You Shop Around for Good Credit Deals", Chicago Tribune, Nov. 23, 1993, 2 PP.

Rosenberg, Joyce M. "GE Capital Comes to Macy's aid Again", AP Worldstream Feb. 17, 1994, 2 PP.

Booker, Ellis, "Checkout Lines to Offer More Than Just Candy and Waiting", Computerworld, PC's & Workstations, May 21, 1990 at p. 47, 1 page.

Shaw, Robert, "How the Smart Card is Changing Retailing", Long Range Planning, 1991, vol. 24, No. 1 at pp. 111 to 114, 4 pp.

"Checkstands Boost Supermarket Profits", Chain Store Age Executive, Checkstand Design and Productivity, Dec. 1991 at p. 158, 2 pp.

"Set-top 'Converger'; Interactive Initiatives Abound at NCTA Convention", Communications Daily, Jun. 10, 1993 vol. !3 No. 111, at p. 9, 2 pp.

Tedesco, Richard. "Pactel Pushes Net Access." Broadcasting & Cable. Jun. 3, 1996, pp. 64-65.

Colman, Price. "Cross-marketing Cuts Cable Bills." Broadcasting & Cable. Jul. 15, 1996, p. 44, 2 pp.

Fleming et al. "European Banks, Insurance Firms Cross into Each Other's Territory." Wall Street Journal. (Europe) Feb. 29, 1991, p. 9, 4 pp.

"POS spectrum: a lottery looks to POS for growth", POS News, Jan. 1989, Section: vol. 5, No. 7, p. 8, ISSN: 0896-6230, Coden: BHORAD, 1 page.

"Let's Play the Cash Register Receipts Lottery", The New York Times, Dec. 25, 1990, Section: Section 1, p. 30, col. 4, Editorial Desk, 1 page.

Del Rosso, Laura, "Marketel says it plans to launch air fare 'auction' in June; Marketel International", Travel Weekly, Apr. 29, 1991, Section: vol. 50, No. 34, p. 1, ISSN: 0041-2082, 4 pp.

"Philips offers customers financing through Citicorp; Philips Medical Systems North America, Citicorp North America Inc." Health Industry Today, Jun. 1991, Section: vol. 54, No. 6, p. 4, ISSN: 0745-4678, 1 page.

"Coupons get serious; supermarkets use barcodes to prevent misredemptions", Chain Store Age Executive with Shopping Center Age, Oct. 1992, Section: vol. 68, No. 10, p. 68, ISSN: 0193-1199, 2 pp.

"Winn-Dixie/The Salvation Army Report Contributions For War Against Hunger", PR Newswire, Jun. 10, 1993, Section: Financial News, 1 page.

Jones, Jeanne, "Data Readers Streamline Management . . . ", The Houston Post, Jun. 26, 1994, Section: Business, p. D1, 1 page.

Fiorini, Phillip, "No Place For Penny?", USA Today, Jul. 29, 1994, Section: News, p. 1A, 3 pp.

Smith, Alison, "Survey of UK Consumer Credit and Asset Finance", Financial Times, Nov. 3, 1994, p. VI, 3 pp.

News Release: Linnen, Herb et al. "AT&T comments on new FCC rules to curb 'slamming'", Jun. 14, 1995, 4 pp.

Andreoli, Tom et al., "Cash Machines Offer A Whole Lotto Money . . . ", Crain's Chicago Business, Jun. 19, 1995, Section: News, p. 8, 2 pp.

Knippenberg, Jim, "Will local radio empires strike back?", The Cincinnati Enquirer, Jul. 23, 1995, Section: Tempo, p. F01, 1 page.

"Cyberbid", Net Fun Ltd., Copyright 1996, 9 pp.

Hadley, Kimberly, "Pastors praying anti-arson effort will burn bias", The Nashville Banner, Jul. 26, 1996, Section: News, p. A13, 1 page.

Gapper, John, "NatWest reports rise in bad debt", Financial Times, Jul. 31, 1996, Section: News, UK, p. 09, 1 page.

"Lynx Technology: Lynx to provide business leasing program through Schroder Leasing", M2 Presswire, Aug. 9, 1996, 2 pp.

Taylor, Paul, "Towards a dream market", Financial Times, Sep. 4, 1996, Section: Survey—FT IT, p. 03, 2 pp.

Bonnici, Joseph et al., "Consumer issues in coupon usage: An exploratory analysis", Journal of Applied Business Research, winter 1996/1997, vol. 13, No. 1, pp. 31-40, ISSN: 0892-7626, Coden: JPBEBK, 11 pp.

"Happy Anniversary, here's your Cashback Bonus® Award", Private Issue by Discover, Copyright 1997, Greenwood Trust Company, 3 pp.

Rehayem, Gilbert, "Opinion: X-Press Betting", La Fleur's Lottery World, Feb. 7, 1997, 1 page.

Singletary, Michelle, "Electronic World, Unchecked Problem?", The Washington Post, Mar. 4, 1997, Section: Financial, p. C01, 4 pp.

"Products and Services, Checkout Direct", Catalina Marketing Corporation, (http //catalinamktg com/prodcdir htm), download date: May 29, 1997, 16 pp.

Riordan, Teresa, "Patents; A novel approach to making a better spermicide harks back to some old-fashioned methods.", The New York Times, Jun. 9, 1997, Section D, p. 2, col. 1, Business/Financial Desk, 3 pp.

Nairn, Geoff, "The key to your identity: Falling costs will allow fingerprint verification to be widely used", Financial Times (London), Jul. 15, 1997, Section: Technology, p. 12, 3 pp.

"Switch your Chase MasterCard to a Shell MasterCard from Chase and you'll earn: Free Formula Shell Gasoline", Chase Manhattan Bank USA, N.A., Sep. 1997, 2 pp.

Ross, Chuck et al., "Coke Card promotion set for '98", (http //adagecom/news_and_ features/features/19971117/article3 html), Copyright Nov. 1997, 2 pp.

"NCR 7453 PC-Based Point-of-Sale Solution", NCR Corporation, Copyright 1998, 2 pp.

"For the Crew & the Customer", Olivetti, Winter, 1998, 2 pp.

Krauss, Jeffrey, "Subsidized TV sets?", CED (Communications Engineering & Design), Feb. 1998, 3 pp.

Goldblatt, Henry, "AT&T Finally Has An Operator . . . ", Fortune, Feb. 16, 1998, Section: Features/Telcos, p. 79, 4 pp.

Elstrom, Peter, "Reach Out and Pay Someone", Business Week, Mar. 23, 1998, p. 4, 1 page.

"Cross-Sell Billing Statement Acquisition System", Apr. 7-9, 1998, 2 pp.

Website: "MCI Freeflix Free Video Rental Program", (http //www mci com/aboutus/products/prepaid/promotional shtm), download date: Apr. 21, 1998, 1 pp.

Website: "MCI PrePaid Card Retail Promotional Opportunities", (http //www mci com/aboutus/products/glossary/home/freeflix shtml), download date: Apr. 21, 1998, 2 pp.

Website: "Wall Street Access . . . : Active Trader Rebate Program", (http //www wsaccess com/active_rebate_program htm), download date: Apr. 22, 1998, 2 pp.

"IAFC Launches NextCard (sm)—The First True Internet VISA", (http //www nextcard com/releasel html), download date: Sep. 14, 1999, 2 pp.

Goldberg, Jeff, "Cellular phone information from Point.com", (http www point com/articles/489 asp), download date: Nov. 16, 2000, 7 pp.

"Milestone Events Making Spring History 1899-1989", undated, 1 page.

Sims, Calvin, "Centel Acquiring Cellular Phone Unit", The New York Times, May 28, 1988, Section 1, p. 33, col. 3, Financial Desk, 2 pp.

Butcher, Lola, "United May Pocket Windfall With Sale of Cellular Business", Kansas City Business Journal, Jun. 6, 1988, Section: vol. 6, No. 38, Section 1, p. 8, 3 pp.

Winter, Christine, "GTE to Sell Part of US Sprint Stake Deal to Shift Another 30% to Partner United Telecom", Chicago Tribune; Jul. 19, 1988, Section: Business, p. 2, Zone C, 2 pp.

"United Telecommunications Announces Completion of Sale", PR Newswire, Oct. 5, 1988, 2 pp.

Henze, Doug, "A Tightening in Cellular Market", Oakland Business Monthly, Aug. 1989, Section 1, vol. 7, No. 8, p. 45, 6 pp.

"United Telecom halts Sprint deal as net falls", Chicago Tribune, Jul. 18, 1990, Section: Business, p. 1, Zone C, 3 pp.

Connely, Joanne, "FCC gets spectrum comments; US Federal Communications Commission investigates development of personal communications networks and radio-based technologies", Chilton's Electronic News, Jan. 28, 1991, Sec.:No. 1845, vol. 37, p. 10, ISSN: 1054-6847,3 pp.

Manuta, Lou, "Should cellular be deregulated? Cellular radio telephones; Industry Overview", Cellular Marketing, Jan. 1992, Section: vol. 7, No. 1, p. 20, ISSN: 0890-2402 6 pp.

Rossa, James L., "Cellphones ride roller coaster; American Information Technologies Corp. to cut commission rebates to retailers", HFD-The Weekly Home Furnishings Newspaper, Feb. 3, 1992, Section: vol. 66, No. 5, p. 89, ISSN: 0746-7885, 3 pp.

La Rossa, James Jr., "Ameritech policy stirs debate; executives weigh retailer rebates on eve of Cellular Telecommunications Industry Association Show; American Information Technologies Corp; Special CTIA Show Issue", HFD-The Weekly Home Furnishings Newspaper, Feb. 10, 1992, Section: vol. 66, No. 6, p. 81, ISSN: 0746-7885, 3 pp.

Ziegler, Bart, "Sprint to Merge with Centel", Associated Press, May 28, 1992, Section: Business News, 3 pp.

Marek, Sue, "The carrier/retailer love affair—still going strong? Cellular radio industry; Cover Story", Cellular Marketing, Jul. 1992, Section: vol. 7, No. 7, p. 18, ISSN: 0890-2402, 5 pp.

"Resale Effect Debate; GAO Faults FCC on Cellular Duopoly Scheme", Communications Daily, Jul. 2, 1992, Section: vol. 12, No. 128, p. 3, 2 pp.

Strandjord, Jeannine M., "Should you bundle 401k services? Employee Benefits", Financial Executive, Sep. 1992, Section: vol. 8, No. 5, p. 45, ISSN: 0895-4186, 5 pp.

Brown, Bob and Wallace, Bob, "AT&T bid for McCaw to reshape landscape; Gives dominant carrier access to rapidly evolving market and opportunity to influence, drive, change.", Network World, Nov. 9, 1992, Section: Top News, p. 1, 3 pp.

Avril, Tom, "Centel Confident of Victory After Vote on Sprint Merger", Dec. 2, 1992, Section: Business News, 3 pp.

Avril, Tom, "Communications; Centel Investors Vote on Sprint Merger", The Commercial Appeal, Dec. 3, 1992, Section: Business, p. B4, 2 pp.

Oloroso Jr., Arsenio, "Centel holds its breath; Shareholders wait to see outcome of Sprint deal", Crain's Chicago Business, Dec. 7, 1992, Section: p. 38, 2 pp.

Yates, Ronald E., "Sprint-Centel merger complete despite fears", Chicago Tribune, Mar. 10, 1993, Section: Business, p. 1, Zone N, 3 pp.

Wenske, Paul, "Sprint's big deal", Ingram's, May 1993, Sec.: vol. 19, No. 5, Section, p. 34, 8 pp.

"Petition Criticized; Fight on CPE Unbundling for IXC Resellers Launched by Major Retailers", Communications Daily, Aug. 10, 1993, Section: vol. 13, No. 153, p. 1, 2 pp.

DeFebo, Carl Jr., "Sprint opens first superstore in Mechanicsburg", Central Penn Business Journal, Nov. 3, 1993, Section: vol. 9, No. 22, Section 1, p. 12, 3 pp.

"Testimony Feb. 8, 1994, John V. Roach Consumer Electronics Retailers Coalition House Energy/Telecommunications and Finance Antitrust Reform Act of 1993", Federal Document Clearing House Congressional Testimony, Feb. 8, 1994, 8 pp.

"Sprint—Company Data", Securities and Exchange Commission Form 10-Q, for the quarterly period ended Mar. 31, 1994, 4 pp.

"Form 10-K Sprint Corp—FON", Filed Mar. 15, 1994 (period Dec. 31, 1993), 8 pp.

Kraemer, Joseph S., "Local competition; Changing Ground Rules for Network Access", Business Communications Review, Sep. 1994, Sec.: vol. 24, No. 9, p. S4, ISSN: 0162-3885, 10 pp.

Steward, Shawn, "Activating the masses", Cellular Business, Oct. 1994, Section: vol. 11, No. 10, pp. 72-80, ISSN: 0741-6520, Coden: COHE, 7 pp.

"Sprint—Defining the Communications Company of the Future 1994 Annual Report to Shareholders", Document Date: Dec. 31, 1994, Filing Date: Mar. 22, 1995, 36 pp.

"Inside Sprint Corporation: 1994 Competitive Market Developments", Inside Telecom, Jul. 17, 1995, 7 pp.

"Tandy Corp—Form-Type ARS", Document Date: Dec. 31, 1995, Filing Date: Apr. 10, 1996, 14 pp.

"Sprint Completes Spin-Off of It's Cellular Subsidiary", Chicago Sun-Times, Mar. 8, 1996, Section: Financial, p. 44, 2 pp.

"Securities and Exchange Commission Form 10-K/A, 360 Degrees Communications Co Cross-Reference: Sprint Cellular Co", For the fiscal year ended Dec. 31, 1995, Filing date: Apr. 16, 1996, 23 pp.

Press Release: "Sprint, Sprint Spectrum and Radio Shack Join Forces", New York, NY, Sep. 11, 1996, 5 pp.

Maxon, Terry, "Tandy pairs with Sprint for venture; Companies will offer expanded offering of telecommunications products, services", The Dallas Morning News, Sep. 12, 1996, Section: Business; p. 1B, 2 pp.

"Tandy, Sprint to offer one-stop phone shopping", downloaded from http://web.archive.org/web/19971022163159/www.tandy.com/press/sprinton, copyright Tandy Corporation, 1995, 2 pp.

"Tandy Corporation—Quarterly Report", For the quarterly period ended Sep. 30, 1996, Filed Nov. 12, 1996, 36 pp.

Alleman, James and Cole, Larry, "The International Handbook of Telecommunications Economics, vol. III, Sprint—GTE's lost opportunity", Edward Elgar Publishers, 2002, Chapter 10, 13 pp.

King, Suzanne and Hayes, David, "Sprint PCS has played key role in cell phone boom", Posted: Jan. 6, 2002, 10 pp.

Website: "Sprint 1995 Annual Report—Notes to Consolidated Financial Statements", (http //www sprint com/sprint/annual/95/finance/p_52a html), download date Oct. 21, 2003, 1 page.

Website: "Sprint/History", (http www sprint com/sprint/ir/sd/timeline_02 html), download date: Oct. 22, 2003, 2 pp.

Website: "Surviving the Great Depression", (http //www geocities com/Athens/Column/4735/clbrown2 html), download date: Nov. 13, 2003, 2 pp.

Website: "The Mobile: 20 Years Young", (http: //motoinfo Motorola com/motoinfo/$20^{th}$_anniversary/docs/timeline pdf), download date: Jan. 9, 2004, 2 pp.

Website: "Qualcomm About Qualcomm—History / Key Milestones", (http www qualcomm com/about/history/ html), download date: Jul. 27, 2004, 5 pp.

Schrage, Michael "Free Stuff! Predatory Pricing or Creative Cross-Promotion? You be the Judge; The Beta Version; Industry Trend or Event" Marketing Computers, Oct. 1995, 2 pp.

Marshall, Kyle "More Phone Choices Ring In", The News and Observer Aug. 13, 1996, 2 pp.

Wessel, Harry "Rewarding Experience?; Credit Cards Offering Bonuses Not For Everyone", Chicago Poet-Gazette Dec. 5, 1996, 3 pp.
Selasky, Susan "Easy-To-Swallow Savings; Diner Credit Cards Serve Wide menu of Discounts", Pittsburgh Post-Gazette Dec. 5, 1996, 3 pp.
"Merger Creates alliance Data", Credit Risk Management Report Dec. 16, 1996, 1 page.
Higgins, Stephen "Digital Phone Service on the Way" Business Dateline; New Haven Register, Jan. 7, 1997, 3 pp.
Kerstetter, Jim "E-Commerce Updates Get Intelligent Agents; Electronic Commerce", PC Week Feb. 3, 1997, 2 pp.
Barlow, Rick "Relationship Marketing: Coalition Marketing is Coming Back", Brandweek Apr. 28, 1997, 2 pp.
Simon, Ruth "Make Sure Your Rebate Card Still Delivers the Goods", Money Aug. 1997, 2 pp.
Gilligan, Gregory J. "Credit Cards from Retail Store's a Mixed Blessing for Shoppers", The Richmond Times Dispatch, Jul. 20, 1997, 4 pp.
Fitzgerald, Beth "New Jresey-Based SCA Helps Private Label Credit Cards Take Off", The Star Ledger Aug. 4, 1997.
Sanders, Edmund "Tricky Business; The Magic of Rebate Cards can Quickly Disappear", Chicago Tribune Aug. 18, 1997, 3 pp.
Wijnen, Renee "Cendant Eyes Cross-Marketing Opportunities; CUC Internation-HFS Inc. Merger Expected to Yield an Additional 2 Million Club Members" DM News Feb. 2, 1998, 2 pp.
"Cardholders Think Big" Bank Marketing International Mar. 1998, 3 pp.
Wald, Matthew L. "Spending It; Untying Cellular Phones From Those Annual Contracts" The New York Times Mar. 15, 1998, 2 pp.
"American Eagle Outfitters, Inc. Introduces the First Clear Credit Card" PR Newswire Mar. 26, 1998, 2 pp.
Ling, The Hooi "Prices of Handphones Dive, Thanks to Cross-Subsidies" Business Times Apr. 8, 1998, 2 pp.
"Card Briefs: Beneficial, Casual Male Team Up on Card" The American Banker May 4, 1998 1 pg.
"Points Earn Little Credit as Cardholders Fail to Cash In" Birmingham Post May 9, 1998, 2 pp.
Meece, Mickey "Big Finance Companies May Want Piece of Limited's Private-Label Card Program", The American Banker Apr. 12, 1995, 2 pp.
"Jay Jacobs Inc. Introduces Private Label Credit Card", Business Wire May 18, 1998, 1 page.
"Wellsparks Group Launches V.I.P. Rewards; The Most Comprehensive Relationship Marketing Program Ever Created by a Mall Developer", Business wire May 19, 1998, 2 pp.
"SNET Cellular Value Plans" Brochure, Jun. 12, 1998, 3 pp.
"Shoppers Charge Accounts Co. to Administer Private Label Credit Card for Lew Magram Ltd; Program Marks SCA,s Entry into Retail Catalog/Mail Order Industry" PR Newswire Jun. 29, 1998, 6 pp.
"Cell Phones at 7-11? Almost Everyone is Selling Wireless Service these Days. Here's How to Get the Right Deal" Time Magazine Jul. 6, 1998, 2 pp.
"The Savings Game: Read Fine Print in Rebate Offers by Credit Cards" The Cincinnati Enquirer Aug. 31, 1998, 3 pp.
"Wal-Mart on Retail Road Less Traveled: Cobranding," The American Banker Sep. 11, 1998, 3 pp.
Elkin, Tobi "Promotions: Mastercard Wins Coveted On-Pack Real Estate in Tie-in with Microsoft" Brandweek Sep. 14, 1998, 1 page.
"Clubmacy's" Brochure Sep. 1998, 2 pp.
"Filene's" Credit Card Application, Sep. 1998, 2 pp.
"Dual-Function Cards Latest pitch to Call in Holders" Card Marketing Nov. 1998, 2 pp.
"Issuers Charge Ahead to Focus on Price Vs. Brand", Card Marketing Nov. 1998, 2 pp.
"Competition: First USA, with its Microsoft Pact, is King of the Internet", Credit Card News Nov. 1, 1998, 2 pp.
"Retail Cards: Attention Kmart Card Holders: 6% Back is Dead a New package of Perks is Coming" Credit Card News Nov. 1, 1998, 1 page.
"Microsoft and First USA Announces $90 Million Online Advertising Alliance" EDP Weekly's IT Monitor Nov. 2, 1998, 2 pp.

Feldman, Amy "Paying with Plastic Not Such a Smart Idea", New York Daily News Nov. 4, 1998, 2 pp.
Cowell, Alan "America's Turn to Colonize; Creditcard Issuers Invade Britain, with U.S. Firepower", The New York Times Nov. 12, 1998, 5 pp.
"No. 1 Online Department Store Joins Clickrewards" PR Newswire Nov. 27, 1998, 3 pp.
Shermach, Kelly "Partnerships Help Issuers Web Concepts", Card Marketing, Dec. 1998, 2 pp.
"Largest Internet Ad Deal Signed", Bank Marketing International, Dec. 1998, 3 pp.
"Amazon.com and Netflix.com Establish Promotional Relationship for the Sale and Rental of DVD Titles" Business Wire Dec. 4, 1998, 3 pp.
"At Sports Superstore Online, Shoppers Get More for Their Money; 10,000 Reasons to Shop at Sports Superstore Online", Business Wire Dec. 4, 1998, 2 pp.
"Credit Card Enticements" NPR Moning Edition, Dec. 23, 1998, 3 pp.
"Pagers That Can Spell It All Out", Business week Jan. 16, 1995, 2 pp.
Block, Valerie "GM Turns Up the Heat with Plan to Cross-sell some Financial Products," The American Banker Nov. 18, 1994, 2 pp.
International Search Report for PCT Application No. PCT/US99/21720 mailed Mar. 23, 2000, 6 pp.
International Search Report for PCT Application No. PCT/US99/13819 mailed Oct. 21, 1999, 8 pp.
International Search Report for PCT Application No. PCT/US99/13409 mailed Oct. 21, 1999 6 pp.
International Search Report for PCT Application No. PCT/US99/19955 mailed Feb. 23, 2000, 2 pp.
Written Opinion for PCT Application No. PCT/US99/13819 mailed May 16, 2000, 6 pp.
Written Opinion for PCT Application No. PCT/US99/13409 mailed May 16, 2000, 9 pp.
Spoor, Dana L., "Selling a free phone", Cellular Business, Feb. 1994, vol. 11, No. 2, pp. 58-62, ISSN: 0741-6520, 3 pp.
Crump, Stuart F. Jr., "Faith goes cellular (case study of a real estate agent's selection of a cellular phone and carrier)", Home Office Computing, Jun. 1994, vol. 12, No. 6, p. 110(2), 4 pp.
Krauss, Jeffrey, "Subsidized cable modems—Their time has come", Communications Engineering & Design—Feb. 2001, (http //www cedmagazine com/ced/2001/0201/02cc).
Sabatini, Patricia, "Card sharks; Lurking in the sea of offers you get from credit card companies are some nasty surprises. Unless you read the fine print, you'll be in the companies' jaws before you know it.", Pittsburgh Post-Gazette, Feb. 4, 1996, Section: Business, p. Cl, 8 pp.
Website: "Welcome to the American Airlines Internet Silent Auction", American Airlines, Inc., (http //www Americanair com), download date: Aug. 1996, 8 pp.
Website: "Crest—Cruise/Ferry Revenue Management System", (http www rtscorp com/h2o htm), download date: Aug. 5, 1996, 4 pp.
Wagner, Jim, "Cameras Tell Mall What Door You Use, How Often You Go", Albuquerque Tribune, Aug. 9, 1996, Section: Evening, p. A3, 2 pp.
Nishimoto, Lisa, "Market Analysis; Travel services are first online commerce offerings to fly; Many corporations arrange flight, car rental, and hotel bookings on the Internet", Infoworld, Jul. 29, 1996, Section: Internet p. 44, 2 pp.
Fickenscher, Lisa, "Amex to Start Free Rewards Program with Discounts on Merchandise", The American Banker, Oct. 18, 1996, Section: Credit/Debit/ATMS, p. 10, 2 pp.
Fitzgerald, Kate, "Amex program moves loyalty to next level: Custom Extras finds a medium customers can't ignore: Billing Statements", Advertising Age, Nov. 4, 1996, Section: News, 2 pp.
"World's First Real-Time Travel Auction Service to be Available Via World Wide Web; ETA to Open Bidding to Consumers, Travel Industry; Web Auction Leader eBay to Provide Technology Support", Business Wire, Nov. 4, 1996, 2 pp.
Website: "Web Ventures presents Bookit!", (http //www webventures com/bookit), download date: Dec. 2, 1996, 1 pg.
Nimmer, Raymond T., "Commercial Transactions on the Global Information Infrastructure: Electronic Contracting: Legal Issues", The John Marshall Journal of Computer Information Law, 14 J. Marshall J. Computer & Info. L. 211, Winter 1996, 26 pp.

Bryant, Adam, "Shaking Up Air Fares' Status Quo; Entrepreneur Seeks Break for Last-Minute Business Fliers", The New York Times, Apr. 1, 1997, Section: Section D, p. 1, col. 2, Business/Financial Desk, 4 pp.

"Dispensing the future", Electronic Payments International, May 1997, Section: Feature; 5 pp.

Website: "Frequently Asked Questions about: AIRHITCH", (http //www isicom fr/airhitch/ahfaq), download date: May 6, 1997, 5 pp.

"Industry Briefs", Card News, Jun. 9, 1997, Section: vol. 12, No. 11, 2 pp.

"Internet mortgage service eliminates loan agents and passes commissions on to the consumer", Business Wire, Jun. 30, 1997, 2 pp.

"The United Computer Exchange: How it All Works", The Untied Computer Exchange Corporation, (www uce com/howitworks html), download date Jul. 23, 1997, 6 pp.

"Classifieds2000 The Internet Classifieds", (http www classifieds2000 com/cgi-cls/Display exe?C2K+aboutus), download date: Aug. 6, 1997, 3 pp.

Brochure: "Tired Of Shopping For The Best Home Loan?", Mortgage Loan Specialists, Aug. 7, 1997, 2 pp.

Website: "HomeShark Refinance Check", (http //www homeshark com/homewatch/refi/refistep1 htm), download date: Aug. 13, 1997, 6 pp.

"General trading information and terms provided by tradingfloor. com", Tradingfloor.com, (http //www tradingfloor com/info htm), download date: Aug. 14, 1997, 11 pp.

"Nasdaq", (http //home axford com/corfin/corf11 htm), download date: Aug. 15, 1997, 3 pp.

Website: "The Nasdaq Stock Market, Inc. ('Nasdaq') Consolidated Subscriber Agreement", (http //www pcquote com/geninfo/exchange/ex_nasdaq php), download date: Aug. 15, 1997, 5 pp.

"Case-in-POINT: Case Study: Bloomingdale's, Inc.", (http www acxiom comcip-cs-b htm), download date: Sep. 23, 1997, 2 pp.

Website: "NCR 7452 Workstation—Beyond Traditional POS", (http //www ncr com/product/retail/products/catalog/7452 shtml), download date: Sep. 23, 1997, 3 pp.

Brochure: OpenSite Technologies Inc., copyright 1998, 8 pp.

New Partners more exciting rewards: The Membership Rewards Program for 1998, (http // ww americanexpress com rewards news docs 1998ne w mr shtml), 38 pp.

Hemsley, Steve "Research and Destroy . . . " Marketing Week, Apr. 16, 1998, Section: Point of Purchase, 3 pp.

Website: Collector's Super Mall Information, (http // www csmonline come help aboutcsm html) Apr. 23, 1998, 4 pp.

Amato-McCoy, Deena, "Co-Branded Acme Credit Card Rewards Loyal Users" Supermarket News, Jun. 15, 1998, Section: p. 17, ISSN: 0039-5803, 2 pp.

"Acme Markets, U.S. Bankcorp Debut Visa Rewards Card", Card News, Jun. 22, 1998, Section: vol. 13, No. 12, 1 p.

Rubenstein, Ed, "Prepaid program lets Galleria guests dine a la Card", Nations Restaurant News, Jun. 29, 1998, Section: Technology, 1 pg.

"DataCard Partners With CSI To Offer Card-Based Loyalty Solution to Merchants", Business Wire, Jul. 9, 1998, 1 pg.

Albright, Mark, "Grocery savings via Web coupons", St. Petersburg Times, Jul. 22, 1998, Section: Business, 2 pp.

Website: "DealDeal com—The Best Auction Deals on the . . . ; Bid To Win", (http www dealdeal com/pxfm/bidandwin cfm?classID=elc &cid=&cal=), download date: Oct. 29, 1998, 2 pp.

Mr. Pigeon "Cell Phone Hype Pigeon Family Sweats The Details", Star Tribune, Jan. 29, 1995, 5 pp.

Parker, Penny "Cart vendors offer line-free shopping", Denver Post, Dec. 20, 1995, 2 pp.

Website: "Amazia Endeavour Travel—TS60 Eight Day New Zealand Fly Drive Package", (http //www anzac com/endvr/ts60 html), download date: Jan. 17, 1999, 2 pp.

Website: "The Sabre Group—Sabre Decision Technologies", (http www sdt com), undated, 6 pp.

Website: MasterCard—The Smart Card: News & Views, Using Smart Cards to Deliver New Value, (http // www mastercard com/ ourcards/smartcard/articles/ar ticle4 html), Copyright 1994-2000, 5 pp.

Lacher, Lisa, "Coupon Gimmick Registers Profits", Business Record, Dec. 7, 1987, Section: vol. 83, No. 47, Sec. 1, 2 pp.

Stevens, Lawrence, "Hypermarket challenge", Computerworld, Dec. 10, 1988, Section: Software & Services, 2 pp.

Kuttner, Robert, "Computers May Turn The World Into One Big Commodities Pit", Business Week, Sep. 11, 1989, Section: Economic Viewpoint, No. 3123, 2 pp.

Golden, Fran, "AAL's Riga doubts Marketel's appeal to retailers; Chris Riga of American Airlines", Travel Weekly, Nov. 13, 1989, Section: vol. 48, No. 91, 2 pp.

"Safeway Introduces Store-Generated Coupons", PR Newswire, May 1, 1990, 1 pg.

Ritter, Jeffrey, "Scope of the Uniform Commercial Code: Computer Contracting Cases and Electronic Commercial Practices", The Business Lawyer, Aug. 1990, Section: Survey, 20 pp.

Pelline, Jeff, "Travelers Bidding on Airline Tickets SF firm offers chance for cut-rate fares", The San Francisco Chronicle, Aug. 19, 1991, Section: News, 5 pp.

Blattberg, Robert C., "Interactive marketing; exploiting the age of addressability", Sloan Management Review, Sep. 22, 1991, Section: vol. 33, No. 1, 15 pp.

Del Rosso, Laura, "Ticket-bidding firm closes its doors; Marketel International", Travel Weekly, Mar. 12, 1992, Section: vol. 51, No. 21, 3 pp.

McDowell, Bill, "Frequency marketing builds repeat business; Management", Building Supply Home Centers, Aug. 1993, Section: No. 2, vol. 165, p. 96, ISSN: 0890-9008, 5 pp.

Fitzgerald, Kate, "Dual-function Cards Latest Pitch To Call in Holders", Card Marketing, Nov. 1998, vol. 2, No. 10, (http //cardmarketing faulknergray com), 2 pp.

Speidel, Richard, "Impact of Electronic Contracting on Contract Formation Under Revised UCC Article 2, Sales", The American Law Institute—ABA Course of Study, Dec. 9, 1993, 4 pp.

"Cardbriefs: Stored-Value Card Designed for Casinos", The American Banker, Oct. 31, 1995, Section: Credit/Debit/ATMS, 1 pg.

"Tecmark Reward Terminal", (http //www tecmarkinc com/terminal htm), copyright, 1996 Tecmark Services, Inc., 1 pg.

"Draft—Uniform Commercial Code Revised Article 2. Sales—Parts 2,3, and 7", The American Law Institute, Jan. 4, 1996, 24 pp.

"MyPoints: Members Guide", (http www mypoints com/mp/dStatial show?isref=main nonmemberguide default), download date: Apr. 28, 2000, 5 pp.

Website: "Verizon Wireless at Radio Shack", (http //www radioshack com/Partners/Verizon/VerizonLanding asp?ln—ve), Copyright 2003, 3 pp.

Website: "The Loan Process", Mortgage Loan Specialists, (http //web archive org/web/1970715200608/http //www sdtech com/mls/ process html), download date: Sep. 30, 2003, 3 pp.

Website: "The Nasdaq Stock Market, Inc. ('Nasdaq') Consolidated Subscriber Agreement", (http //www pcquote com/geninfo/exchange/ex_nasdaq php), download date: Sep. 30, 2003, 4 pp.

Website: "NETIS—Internet's Largest Auction Site for Auction Information", (http web archive org/web/19980703174530/http //www2 auctionweb com/), 9 pp.

Website: "Phonemiser: Frequently Asked Questions", (http //web archive org/web/19970601100142/http //www phonemiser com/faq htm), download date: Sep. 30, 2003, 8 pp.

Website: "Welcome to Sotheby's", (http //web archive org/web/ 19970101034054/http www sotheby's com/), download date: Sep. 30, 2003, 2 pp.

Website: "Welcome to Trade-direct", (http //web archive org/web/ 199702121309834/http //www trade-direct com/), download date: Sep. 30, 2003, 2 pp.

Website: "Airhitch Your Way to Low Cost Travel!", (http //web archive org/web/19970416104620/http //www vaportrails com/Budget/BudFeatures/Airhitch/A... ), download date: Nov. 7, 2003, 2 pp.

Carroll, Richard, "TravelASSIST Magazine—Travel Deals—Hitch a Flight to Europe", (http //web archive org/web/19970118210259/ http //www travelassist com/mag/a69 html), download date: Nov. 7, 2003, 1 pg.

Rozen, Miriam, "What's New in Joint Promotions", The New York Times, Mar. 10, 1985, Section 3, Financial Desk, 1 pg.

Katcher, P. Royall, "Getting products to consumers; The Basics of Retailing, part 2", Automotive Marketing, May 1990, Section: vol. 19, No. 5, ISSN: 0193-3264, 1 pg.

McKinney, Jeff, "Merchant program could pay off for provident", The Cincinnati Enquirer, Mar. 24, 1996, Section: Financial, 2 pp.

Website: "Rate Hunter", (http //207.49.64.77/rhprodrh htm), download date: Jul. 14, 1996, 2 pp.

Website: "Cathay Pacific—Cyber Traveler Auction #3—Official Rules", (http //www cathaypacific com), download date: Jul. 30, 1996, 4 pp.

"UK's World Telecom Unveils New WorldSaver Tariffs", Newsbytes, Feb. 13, 1997, 1 pg.

Fickenscher, Lisa, "Merchant: American Express Seeks to Mine Its Data on Cardholder Spending Patters", The American Banker, Mar. 24, 1997, Credit/Debit/ATMS, 2 pp.

Kelsey, John et al., "Conditional Purchase Orders", Fourth ACM Conference on Computers, Apr. 1997, 8 pp.

"About IAO", (http //www iaoauction com/about htm), download date: Sep. 8, 1997, 10 pp.

"Welcome to ONSALE", ONSALE, Inc., (http www onsale com), download date: Sep. 8, 1997, 15 pp.

Hoeschen, Brad, "Brookfield Square hopes mall card strikes a chord", Business Journal-Milwaukee, Sep. 12, 1997, Section: vol. 14, No. 50, 2 pp.

Holton, Lisa Cable Efforts Help Insurers Tune Into New Markets:, Card Marketing, Jan. 1999, 2 pp.

Shook, David "Rebate Limits Can Be A pain for Consumers", The Buffalo News, Jan. 5, 1999, 2 pp.

Samuelson, Paul "Economics Ninth Edition", McGraw Hill Book Company, 1973, 10 pp.

Blattberg, Robert C and Levin, Alan, "Modeling The Effectiveness And Profitability Of Trade Promotions", Marketing Science, 1987, 23 pp.

Jensen, Elizabeth, "Yaking It Up" The Wall Street Journal Europe, Apr. 28, 1998, 5 pp.

Point.com, webpage, copyright 1998-2000, 6 pp.

Booker, Ellis, "Checkout lines to offer more than just candy and waiting", Computer World, May 21, 1990, 1 pg.

Shaw, Robert, "How the Smart Card is Changing Retailing", vol. 24, 1991, 4 pp.

Travel Agent No Show Crackdown, vol. 287, No. 6, 1 pg.

Website: "Apollo Host Computer", (http //www Apollo com), undated, 4 pp.

Brochure: "Reaching Out in New Directions", Fist Data Corporation, Merchant Services, 19 pp.

Sprint Opens First Store In Mechanicsburg, Central Penn Business Journal, Nov. 3, 1993, 3 pp.

Foster, Ed, "Can mixing 'cookies' with online marketing be a recipe for heartburn?", InfoWold, Jul. 22, 1996, 2 pp.

Patch, Kimberly PC Week, Sled, InterNIC debut Internet Services, May 16, 1994, 1 pg.

Office Action for U.S. Appl. No. 09/282,747 mailed Sep. 7, 2007, 23 pp.

Office Action for U.S. Appl. No. 09/282,747 mailed Feb. 27, 2007, 24 pp.

Office Action for U.S. Appl. No. 09/282,747 mailed Mar. 21, 2006, 21 pp.

Office Action for U.S. Appl. No. 09/282,747 mailed Dec. 7, 2004, 12 pp.

Office Action for U.S. Appl. No. 09/282,747 mailed Apr. 13, 2004, 14 pp.

Office Action for U.S. Appl. No. 09/282,747 mailed Nov. 19, 2002, 18 pp.

Office Action for U.S. Appl. No. 09/282,747 mailed Mar. 1, 2002, 20 pp.

Office Action for U.S. Appl. No. 09/282,747 mailed May 21, 2001, 35 pp.

Office Action for U.S. Appl. No. 09/282,747 mailed Oct. 13, 2000, 34 pp.

Office Action for U.S. Appl. No. 09/322,351 mailed Aug. 20, 2007, 25 pp.

Office Action for U.S. Appl. No. 09/322,351 mailed Nov. 30, 2006, 26 pp.

Office Action for U.S. Appl. No. 09/332,351 mailed Mar. 13, 2006, 20 pp.

Office Action for U.S. Appl. No. 09/332,351 mailed Nov. 19, 2004, 22 pp.

Office Action for U.S. Appl. No. 09/332,351 mailed Jan. 27, 2003, 28 pp.

Office Action for U.S. Appl. No. 09/332,351 mailed Sep. 25, 2001, 22 pp.

Office Action for U.S. Appl. No. 09/332,351 mailed Oct. 12, 2000, 34 pp.

Board of Appeals Decision for U.S. Appl. No. 09/540,034 decided Mar. 26, 2007, 16 pp.

Examiner's Answer for U.S. Appl. No. 09/540,034 mailed Jan. 23, 2006, 44 pp.

Office Action for U.S. Appl. No. 09/540,034 mailed Oct. 10, 2003, 21 pp.

Office Action for U.S. Appl. No. 09/540,034 mailed Jan. 14, 2003, 21 pp.

Office Action for U.S. Appl. No. 09/219,267 mailed Mar. 10, 2009, 15 pp.

Office Action for U.S. Appl. No. 09/219,267 mailed Jan. 5, 2010, 15 pp.

Office Action for U.S. Appl. No. 11/423,493 mailed Oct. 18, 2007, 21 pp.

Office Action for U.S. Appl. No. 11/423,493 mailed Jan. 26, 2007, 6 pp.

Office Action for U.S. Appl. No. 11/423,498 mailed Oct. 18, 2007, 9 pp.

Office Action for U.S. Appl. No. 11/423,498 mailed Jan. 26, 2007, 6 pp.

Office Action for U.S. Appl. No. 09/274,281 mailed Jun. 29, 2007, 5 pp.

Examiner's Answer for U.S. Appl. No. 09/274,281 mailed Oct. 31, 2006, 13 pp.

Office Action for U.S. Appl. No. 09/274,281 mailed Jul. 27, 2005, 9 pp.

Office Action for U.S. Appl. No. 09/274,281 mailed Apr. 10, 2003, 7 pp.

Office Action for U.S. Appl. No. 09/274,281 mailed Apr. 12, 2002, 9 pp.

Office Action for U.S. Appl. No. 09/579,215 mailed Jul. 12, 2007, 18 pp.

Office Action for U.S. Appl. No. 09/579,215 mailed Mar. 6, 2006, 19 pp.

Office Action for U.S. Appl. No. 09/579,215 mailed Dec. 17, 2004, 20 pp.

Office Action for U.S. Appl. No. 09/579,215 mailed Apr. 7, 2004, 32 pp.

Office Action for U.S. Appl. No. 09/579,215 mailed Jul. 29, 2003, 20 pp.

Marn, Michael, Rosiello, Robert L., Managing Price, gaining profit, Autumn 1992, 10 pp.

Howard, Lisa S., RM sees outsourcing challenge, National Underwriter Property & Casualty-Risk & Benefits Management, Nov. 24, 1997, 2 pp.

Shamrock Technology Co. Establishes No. American HQ as monitor manufacturer continues market expansion, Business Wire, Mar. 25, 1997, 2 pp.

Office Action for U.S. Appl. No. 09/282,747 mailed Dec. 10, 1999, 17 pp.

Office Action for U.S. Appl. No. 09/282,747 mailed Mar. 4, 2009, 16 pp.

Office Action for U.S. Appl. No. 09/282,747 mailed Jun. 12, 2008, 14 pp.

Office Action for U.S. Appl. No. 09/322,351 mailed Aug. 4, 2009, 20 pp.

Office Action for U.S. Appl. No. 09/322,351 mailed Apr. 17, 2008, 19 pp.
Office Action for U.S. Appl. No. 09/219,267 mailed mailed Jun. 13, 2008, 12 pp.
Office Action for U.S. Appl. No. 09/219,267 mailed Sep. 7, 2007, 17 pp.
Office Action for U.S. Appl. No. 09/219,267 mailed Mar. 6, 2006, 19 pp.
Office Action for U.S. Appl. No. 09/219,267 mailed Dec. 14, 2004, 24 pp.
Office Action for U.S. Appl. No. 09/219,267 mailed Jan. 9, 2004, 27 pp.
Office Action for U.S. Appl. No. 09/219,267 mailed Apr. 22, 2003, 18 pp.
Office Action for U.S. Appl. No. 09/219,267 mailed May 17, 2001, 14 pp.
Notice of Allowance for U.S. Appl. No. 09/274,281 mailed Jun. 9, 2010, 5 pp.
Office Action for U.S. Appl. No. 09/274,281 mailed Feb. 20, 2009, 4 pp.
Office Action for U.S. Appl. No. 09/274,281 mailed May 5, 2008, 7 pp.
US 5,709,782, 01/1998, Larson et al. (withdrawn)

\* cited by examiner

*Primary Examiner*—Eric W Stamber
*Assistant Examiner*—Tri V Nguyen

(74) *Attorney, Agent, or Firm*—Fincham Downs, LLC; Michael Downs

(57) ABSTRACT

A merchant server of a first merchant receives an indication of items that a customer is to purchase via a web site. The indication may be, for example, a signal indicating that the customer is ready to "check out" his shopping cart of items on the web site. In response, the merchant server provides an offer for a subsidy from a second merchant. The offer is provided before the items are purchased, and thus the offer is not provided unless and until the customer has manifested an intent to make a purchase from the first merchant. A response is received from the customer. If the response indicates acceptance of the offer, then the subsidy is applied to the items purchased. For example, the total price paid for the items may be reduced, or the items may even be provided to the customer without charge. In exchange, the customer agrees to participate in a transaction with the second merchant. For example, the customer may be required to switch service providers (e.g. long distance telephone service) or initiate a new service agreement (e.g. sign up for a credit card account).

48 Claims, 18 Drawing Sheets

| | ITEM IDENTIFIER 420 | ITEM DESCRIPTION 422 | ITEM PRICE 424 | AVAILABILITY 426 |
|---|---|---|---|---|
| 404 → | P001 | WAR AND PEACE | $13.95 | IN STOCK |
| → | P002 | SUN TZU: THE ART OF WAR | $15.95 | AVAILABLE IN 2-3 DAYS |

| TRANSACTION IDENTIFIER 520 | TIME OF TRANSACTION 522 | ITEMS ORDERED 524 | CREDIT CARD INFORMATION 526 | AMOUNT CHARGED 528 | DELIVERY ADDRESS 530 | CUSTOMER IDENTIFIER 532 |
|---|---|---|---|---|---|---|
| T 000 001 | 1/4/2001 8:07 AM | P038, P049, P812 | VISA 1111-1111-1111-1111 EXP. 3/2002 | $49.87 | 123 MAIN ST. TOWN, USA | NONE |
| T 000 002 | 1/9/2001 9:00 PM | P123 | MASTERCARD 2222-2222-2222-2222 EXP. 9/2002 | $0.00 | 9876 PARK AVE. CITY, USA | C1234 |
| T 000 003 | 1/10/2001 3:02 AM | P456, P789, P789 | AMEX 9999-9999-9999-9999 EXP. 4/2005 | $0.00 | 24 SHADY LA. TOWN, USA | C5678 |

| SUBSIDIZING PARTY IDENTIFIER 620 | SUBSIDIZING PARTY NAME 622 | ACCOUNT 624 | AMOUNT OWED TO MERCHANT 626 |
|---|---|---|---|
| S001 | CREDIT CARD COMPANY X | BANK ACCOUNT #2345678 | $855.00 |
| S002 | LONG DISTANCE TELEPHONE Y | MC 1111-2222-3333-4444 | $4,390.00 |
| S003 | SATELLITE TELEVISION Z | PREPAID BALANCE $10,500 | $0 |

FIG. 6

| OFFER RULE IDENTIFIER 720 | SUBSIDIZING PARTY IDENTIFIER 722 | SUBSIDY AMOUNT 724 | WHEN EFFECTIVE 726 | ADDITIONAL TRANSACTION REQUIRED 728 |
|---|---|---|---|---|
| R00001 | S11 | UP TO $50 | ALWAYS | SIGN UP FOR CREDIT CARD ACCOUNT |
| R0002 | S12 | UP TO $50 | TOTAL PRICE > $300 | SIGN UP FOR CREDIT CARD ACCOUNT |
| R0003 | S12 | $40 | CREDIT CARD = VISA AND TOTAL PRICE > $100 | SIGN UP FOR VISA PLUS ACCOUNT |
| R0004 | 213 | $80 | CUSTOMER IS FROM A NEW ENGLAND STATE | SIGN UP FOR CELLULAR TELEPHONE SERVICE |
| R0005 | S14 | $75 | CUSTOMER DOES NOT HAVE CABLE TELEVISION FROM SERVICE PROVIDER | SIGN UP FOR CABLE TELEVISION |

FIG. 7

| | | | | |
|---|---|---|---|---|
| SUBSIDIZING PARTY IDENTIFIER: S888 902 | | | | |
| TOTAL NUMBER OF OFFERS: 1,794 904 | | | | |
| TOTAL NUMBER OF OFFERS ACCEPTED: 1,003 906 | | | | |
| TOTAL AMOUNT OF SUBSIDIES: $52,800.00 908 | | | | |
| OFFER RULE IDENTIFIER 920 | NUMBER OF OFFERS 922 | NUMBER OF OFFERS ACCEPTED 924 | AMOUNT OF SUBSIDIES DUE 926 | |
| R1111 | 1004 | 500 | $2,500.00 | |
| R2222 | 790 | 503 | $50,300.00 | |

FIG. 9

METHOD AND APPARATUS FOR FACILITATING ELECTRONIC COMMERCE THROUGH PROVIDING CROSS-BENEFITS DURING A TRANSACTION

CROSS-REFERENCE TO RELATED APPLICATIONS

This application is a continuation of U.S patent application Ser. No. 09/219,267 filed Dec. 23, 1998 entitled "METHOD AND APPARATUS FOR FACILITATING ELECTRONIC COMMERCE THROUGH PROVIDING CROSS-BENEFITS DURING A TRANSACTION".

U.S. patent application Ser. No. 09/219,267 is a continuation-in-part of Ser. No. 08/943,483 filed Oct. 3, 1997 and now abandoned entitled "SYSTEM AND METHOD FOR FACILITATING ACCEPTANCE OF CONDITIONAL PURCHASE OFFERS (CPOs)"; which is a continuation-in-part of U.S. patent application Ser. No. 08/923,683 filed Sep. 4, 1997 and issued as U.S. Pat. No. 6,553,346 on Apr. 22, 2003 entitled "CONDITIONAL PURCHASE OFFER (CPO) MANAGEMENT SYSTEM FOR PACKAGES"; which is a continuation-in-part of U.S. patent application Ser. No. 08/889,319 filed Jul. 8, 1997 and issued as U.S. Pat. No. 6,085,169 on Jul. 4, 2000 entitled "CONDITIONAL PURCHASE OFFER MANAGEMENT SYSTEM"; which is a continuation-in-part of U.S. patent application Ser. No. 08/707,660 filed Sep. 5, 1996 and issued as U.S. Pat. No. 5,794,207 on Aug. 11, 1998 entitled "METHOD AND APPARATUS FOR A CRYPTOGRAPHICALLY ASSISTED COMMERCIAL NETWORK SYSTEM DESIGNED TO FACILITATE BUYER-DRIVEN CONDITIONAL PURCHASE OFFERS".

U.S. patent application Ser. No. 09/219,267 is also a continuation-in-part of U.S. patent application Ser. No. 09/100,684 filed Jun. 19, 1998 and issued as U.S. Pat. No. 6,196,458B1 entitled "BILLING STATEMENT CUSTOMER ACQUISITION SYSTEM"; which is a continuation-in-part of U.S. patent application Ser. No. 08/982,149 filed Dec. 1, 1997 entitled "METHOD AND APPARATUS FOR PRINTING A BILLING STATEMENT TO PROVIDE SUPPLEMENTARY PRODUCT SALES" and issued as U.S. Pat. No. 6,196,458 on Mar. 6, 2001.

U.S. patent application Ser. No. 09/219,267 is also a continuation-in-part of U.S. patent application Ser. No. 08/994,426 filed Dec. 19, 1997 and issued as U.S. Pat. No. 6,694,300 on Feb. 17, 2004 entitled "METHOD AND APPARATUS FOR PROVIDING SUPPLEMENTARY PRODUCT SALES TO A CUSTOMER AT A CUSTOMER TERMINAL"; which is a continuation-in-part of U.S. patent application Ser. No. 08/920,116 filed Aug. 26, 1997 and issued as U.S. Pat. No. 6,119,099 on Sep. 12, 2000 entitled "METHOD AND SYSTEM FOR PROCESSING SUPPLEMENTARY PRODUCT SALES AT A POINT-OF-SALE TERMINAL"; which is a continuation-in-part of U.S. patent application Ser. No. 08/822,709 filed Mar. 21, 1997 and issued as U.S. Pat. No. 6,267,670 on Jul. 31, 2001 entitled "SYSTEM AND METHOD FOR PERFORMING LOTTERY TICKET TRANSACTIONS UTILIZING POINT-OF-SALE TERMINALS".

Each of the above-referenced applications is incorporated by reference herein in its entirety.

The present application is also related to the following U.S. Patent Applications:

U.S. patent application Ser. No. 11/423,493 filed Jun. 12, 2006 entitled "METHOD AND APPARATUS FOR FACILITATING ELECTRONIC COMMERCE THROUGH PROVIDING CROSS-BENEFITS DURING A TRANSACTION"; and U.S. patent application Ser. No. 11/423,498 filed Jun. 12, 2006 entitled "METHOD AND APPARATUS FOR FACILITATING ELECTRONIC COMMERCE THROUGH PROVIDING CROSS-BENEFITS DURING A TRANSACTION".

FIELD OF THE INVENTION

The present invention relates to methods and apparatus for facilitating electronic commerce.

BACKGROUND OF THE INVENTION

Electronic commerce is becoming more accepted as growing numbers of customers find shopping via the World Wide Web more appealing. However, electronic commerce suffers many problems that have plagued conventional commerce. For example, there is a great deal of competition among merchants to attract and retain customers that actually make purchases. Price competition is even stronger on the Internet, where customers can more readily "shop around" and determine the prices offered by various merchants.

Even when a customer has browsed a merchant's inventory, he may not make a purchase if an item's price is greater than the customer is willing to pay. One way to increase customer willingness to purchase, via the World Wide Web or otherwise, is to provide discounts on items purchased. Unfortunately, merchants must use discounts sparingly, since reducing purchase prices likewise reduces profits and the reduced profits may not be offset by increased sales.

It is known for a merchant to offer promotions to provide an incentive for customers to make purchases. For example, a merchant may offer a "buy one get one free" promotion whereby a purchase of an item yields the benefit of an additional item at no cost. Similarly, a merchant may provide a discount on a purchase in exchange for signing up for a credit card account provided by the merchant.

It is known to provide a promotion among more than one merchant. For example, a first merchant may advertise that if a product is purchased, a second product may be purchased from or given away by a second merchant.

It is also known for a promotion to be provided at the point of sale. For example, a web site of a merchant may provide a "banner advertisement" that allows a customer to go to another site to make a second purchase.

It would be advantageous to facilitate further electronic commerce in a manner that maintained an acceptable level of profits for merchants yet increased a customer's willingness to make purchases.

SUMMARY OF THE INVENTION

It is an object of the present invention to facilitate electronic commerce.

In accordance with the present invention, a merchant server of a first merchant receives an indication of items that a customer is to purchase via a web site. The indication may be, for example, a signal indicating that the customer is ready to "check out" his shopping cart of items on the web site. In response, the merchant server provides an offer for a benefit from a second merchant, which may be referred to as a cross-benefit. The offer is provided before the items are purchased, and thus the offer is not provided unless and until the customer has manifested an intent to make a purchase from the first merchant. A response to the offer is received from the customer. If the response indicates acceptance of the offer, then the benefit is applied to the items purchased. For example, the total price paid for the items may be reduced, or the items may even be provided to the customer without charge.

In exchange, the customer agrees to participate in a transaction with the second merchant. For example, the customer may be required to switch service providers (e.g. long distance telephone service) or initiate a new service agreement (e.g. sign up for a credit card account). In one embodiment, the customer's agreement may be secured, such that a penalty is assessed against the customer if he does not participate in the transaction as he agreed to.

BRIEF DESCRIPTION OF THE DRAWINGS

FIG. 4 is a representation of an item database of the merchant server of FIG. 2.

FIG. 5 is a representation of a transaction database of the merchant server of FIG. 2.

FIG. 6 is a representation of a subsidizer database of the merchant server of FIG. 2.

FIG. 7 is a representation of an offer rules database of the merchant server of FIG. 2.

FIG. 9 is a representation of a record of an offer summary database of the merchant server of FIG. 2.

DETAILED DESCRIPTION OF THE PREFERRED EMBODIMENTS

Applicants have recognized that the acquisition budgets of various service providers may be advantageously used to facilitate electronic commerce. A customer that is purchasing items from a first merchant may be paid by a second merchant, so that the customer pays a reduced price, or nothing at all, for his desired items. In exchange, the customer signs up or agrees to sign up for a service that is provided by the second merchant. Since many service providers are willing to pay significant amounts of money (e.g. often $50 to $200) to acquire a new customer, the ability to acquire a customer by essentially "intervening" in a sale between others can benefit all parties involved. The customer is benefited by the reduced price of his items, the first merchant is benefited by the increased sales that such an arrangement would bring, and the second merchant is benefited by the acquisition of a new customer.

Furthermore, by presenting offers for such "cross-subsidies" only after a customer is ready to buy items, the merchant may reduce the chance that customers will merely "bargain shop", rather than make purchases.

In addition, a number of benefits may be offered besides reduced prices. For example, the first merchant may alternatively provide the customer with an upsell (e.g. a product upgrade for no additional cost).

Figure 1:
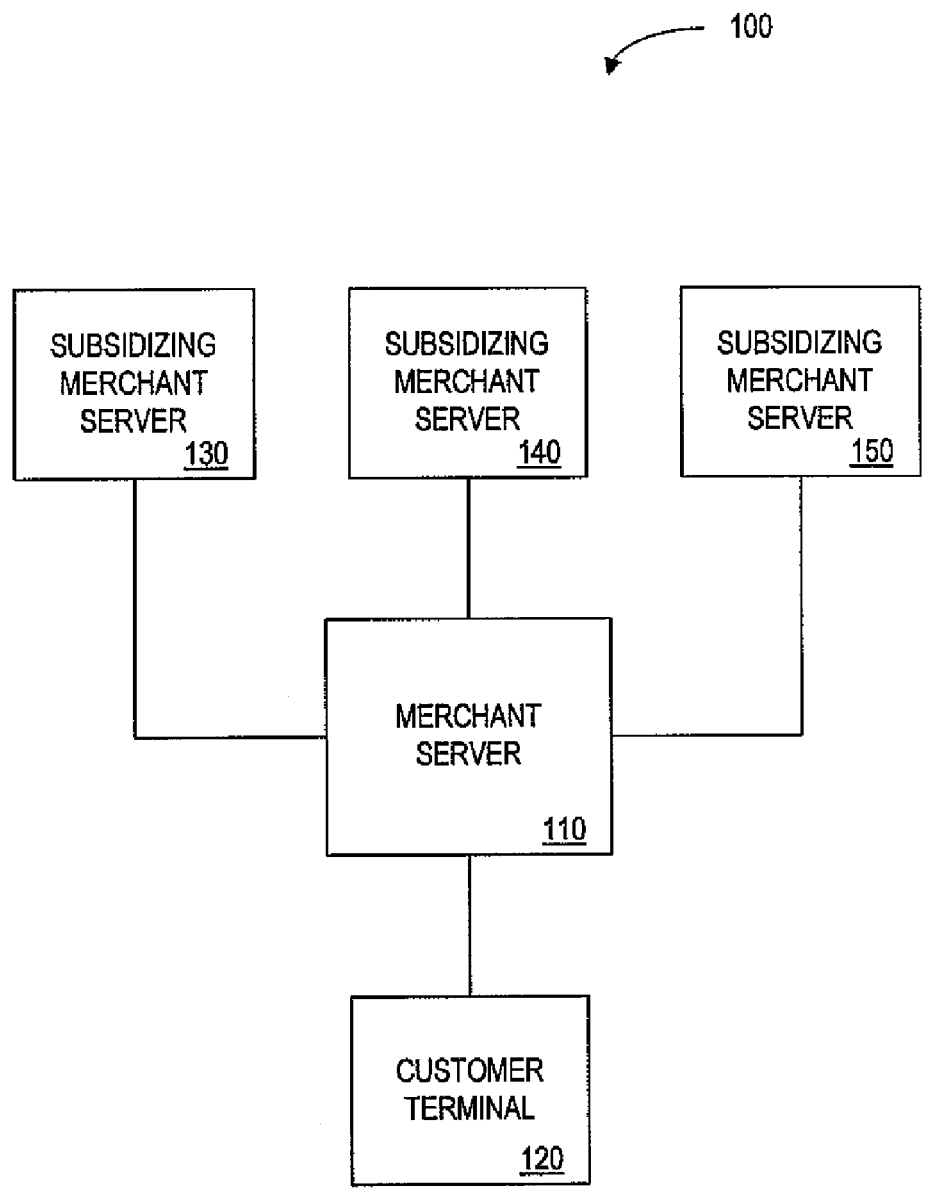
FIG. 1 is a schematic illustration of an apparatus for facilitating electronic commerce.

Referring to FIG. 1, an apparatus 100 includes a merchant server 110 that is in communication with a customer terminal 120 and with subsidizing merchant servers 130, 140 and 150. The merchant server 110 may communicate with the customer terminal 120 and subsidizing merchant servers 130, 140 and 150 via an appropriate network such as the Internet. Each of the customer terminal 120 and with subsidizing merchant servers 130, 140 and 150 may comprise computers, such as those based on the Intel® Pentium® microprocessor, that are adapted to communicate via the Internet (e.g. via a modem). Any number of subsidizing merchant servers and customer terminals may be in communication with the merchant server 110.

The merchant server 110 may be a "web server" of a merchant. The merchant server 110 can generate a web page that may be accessed via the World Wide Web and allow purchases from the merchant to be made in a manner known in the art. A customer terminal may appropriately access the web page to communicate with the merchant server 110 in a manner that is also known to those skilled in the art.

Figure 2:
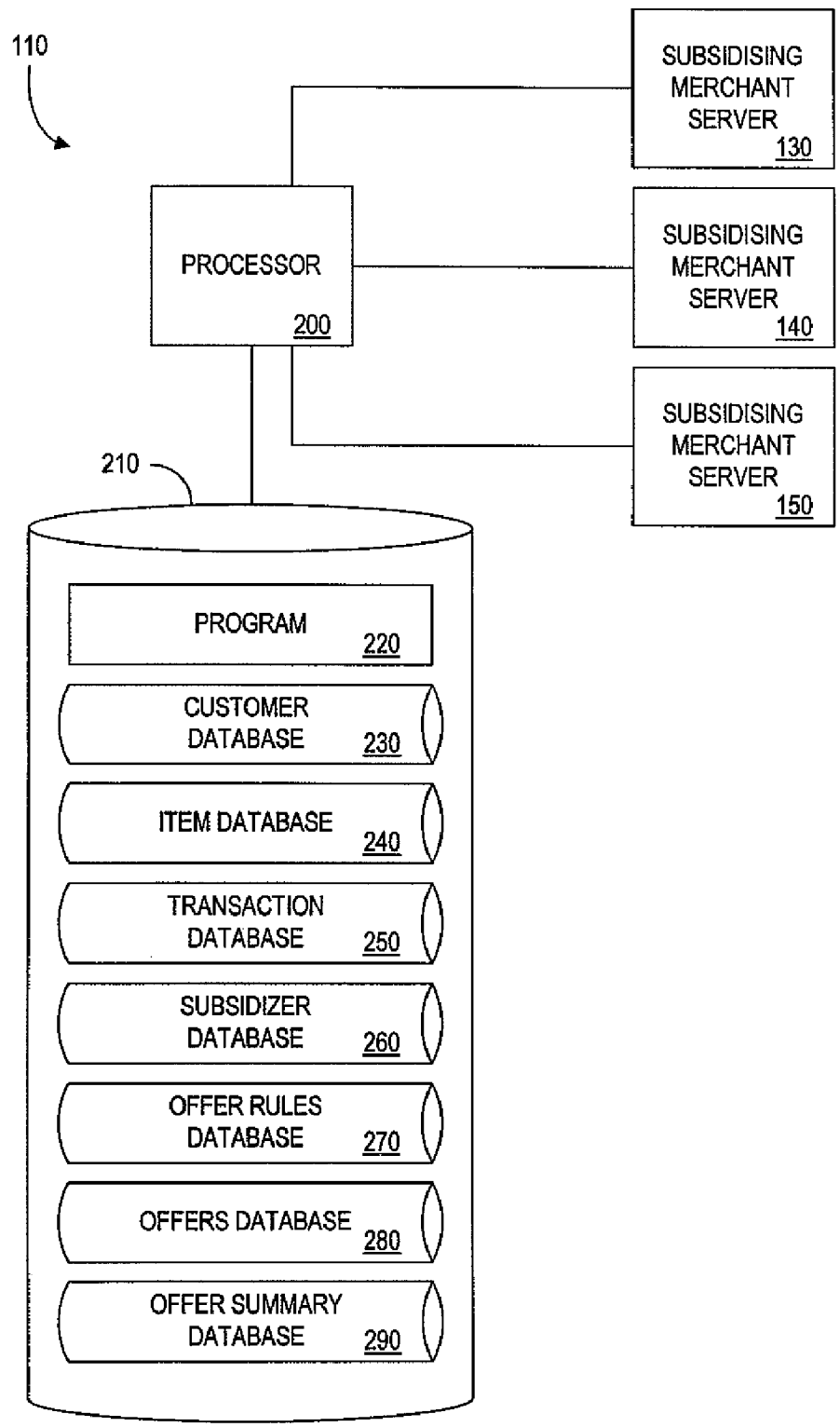
FIG. 2 is a schematic illustration of a merchant server of the apparatus of FIG. 1.

Referring to FIG. 2, the merchant server 110 comprises a processor 200, such as the Intel® Pentium® microprocessor. The processor 200 is in communication with a data storage device 210, such as an appropriate combination of magnetic, optical and/or semiconductor memory. For example, the data storage device 210 may comprise one or more of a ROM, RAM and hard disk. The processor 200 and the data storage device 210 may each be (i) located entirely within a single computer or other computing device; (ii) connected to each other by a remote communication medium, such as a serial port cable, telephone line or radio frequency transceiver; or (iii) a combination thereof. In one embodiment, the merchant server 110 may comprise one or more computers that are connected to a remote server computer for maintaining databases.

The data storage device 210 stores a program 220 for controlling the processor 200. The processor 200 performs instructions of the program 220, and thereby operates in accordance with the present invention, and particularly in accordance with the methods described in detail herein. The program 220 furthermore includes program elements that may be necessary, such as an operating system and "device drivers" for allowing the processor 200 to interface with computer peripheral devices. Appropriate device drivers and other necessary program elements are known to those skilled in the art, and need not be described in detail herein.

The storage device 210 also stores (i) a customer database 230, (ii) a item database 240, (iii) a transaction database 250, (iv) a subsidizer database 260, (v) an offer rules database 270, (vi) an offers database 280 and (vii) an offer summary database 290. The databases 230, 240, 250, 260, 270, 280 and 290 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information, and those skilled in the art will understand that the number and content of the entries can be different from those illustrated herein.

Figure 3:
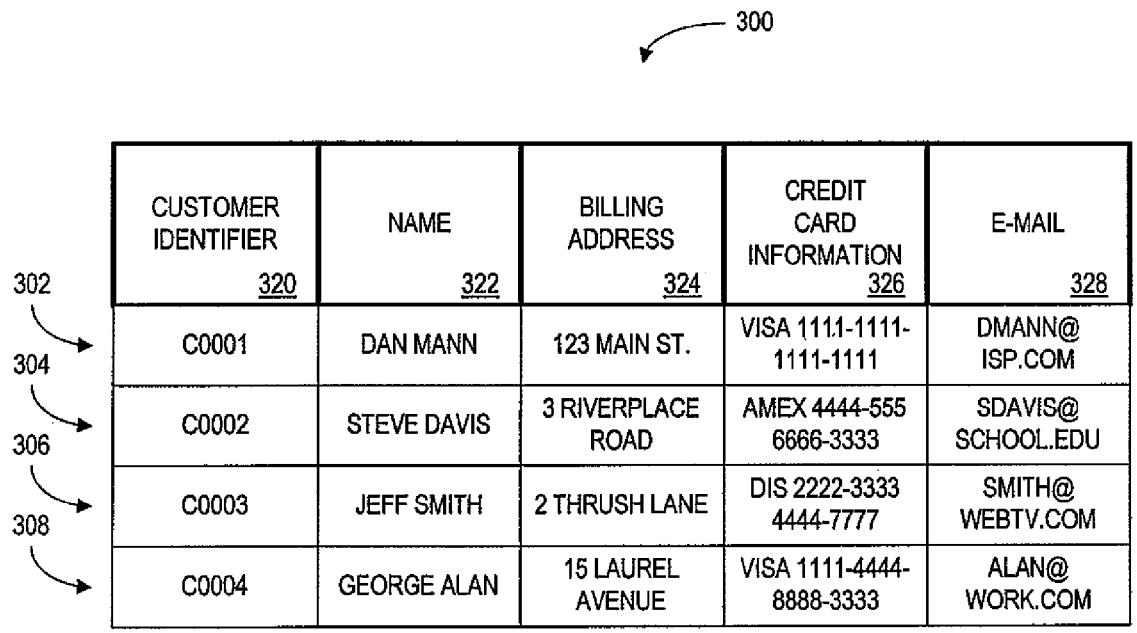
FIG. 3 is a representation of a customer database of the merchant server of FIG. 2.

Referring to FIG. 3, a table 300 represents an embodiment of the customer database 230 (FIG. 2). The table 300 includes entries 302, 304, 306 and 308, each defining a customer that may purchase items via the merchant server 10 (FIG. 1). Those skilled in the art will understand that the table 300 may include any number of entries. The table 300 also defines fields for each of the entries 302, 304, 306 and 308. The fields specify (i) a customer identifier 320 that uniquely identifies the customer, (ii) a name 322 of the customer, (iii) a billing address 324 of the customer, (iv) credit card information 326 which may be used to render payment in purchasing the items, and (v) an electronic mail ("email") address 328 for communication with the customer.

Referring to FIG. 4, a table 400 represents an embodiment of the item database 240 (FIG. 2). The table 400 includes entries 402 and 404, each defining an item sold via the merchant server 10 (FIG. 1). Those skilled in the art will understand that the table 400 may include any number of entries. The table 400 also defines fields for each of the entries 402 and 404. The fields specify (i) a item identifier 420 that uniquely identifies the item, (ii) an item description 422, (iii) an item price 424 for which the item is typically sold, and (iv) an availability 426 of the item which may be based on an inventory level of the item.

Referring to FIG. 5, a table 500 represents an embodiment of the transaction database 250 (FIG. 2). The table 500 includes entries 502, 504 and 506, each defining a transaction with the merchant server 110 (FIG. 1). Typically, the transaction includes a purchase of items by a customer. Those skilled in the art will understand that the table 500 may include any number of entries. The table 500 also defines fields for each of the entries 502, 504 and 506. The fields specify (i) a transaction identifier 520 that uniquely identifies the transaction, (ii) a time 522 of the transaction, (iii) the items ordered 524, (iv) credit card information 526 that may define a credit card account that was charged to pay for the items purchased, (v) an amount charged 528 for the items, (vi) a delivery address 530 for the items, and (vii) a customer identifier 532 (if any) that identifies the customer that made the purchase.

Referring to FIG. 6, a table 600 represents an embodiment of the subsidizer database 260 (FIG. 2). The table 600 includes entries 602, 604 and 606, each defining a party (e.g. another merchant) that may subsidize purchases made via the merchant server 110 (FIG. 1). Those skilled in the art will understand that the table 600 may include any number of entries. The table 600 also defines fields for each of the entries 602, 604 and 606. The fields specify (i) a subsidizing party identifier 620 that uniquely identifies the subsidizing party, (ii) a name 622 of the subsidizing party, (iii) an account 624 used to pay for the subsidies, and (iv) an amount owed 626 by the subsidizing party to the merchant.

Referring to FIG. 7, a table 700 represents an embodiment of the offer rules database 270 (FIG. 2). The table 700 includes entries 702, 704, 706, 708 and 710, each defining an offer rule. When an offer rule is satisfied during a transaction, the merchant provides an offer for a specified benefit, such as a subsidy. Those skilled in the art will understand that the table 700 may include any number of entries. The table 700 also defines fields for each of the entries 702, 704, 706, 708 and 710. The fields specify (i) an offer rule identifier 720 that uniquely identifies the offer rule, (ii) a subsidizing party identifier 722 that uniquely identifies the subsidizing party, (iii) a subsidy amount 724, (iv) when the offer rule is effective (i.e. when the offer rule is satisfied), and (v) an additional transaction 728 that is required of the customer in exchange for the subsidy. As described below, several types of transactions, such as additional purchases or initiating service agreements, may be required of the customer.

Figure 8:
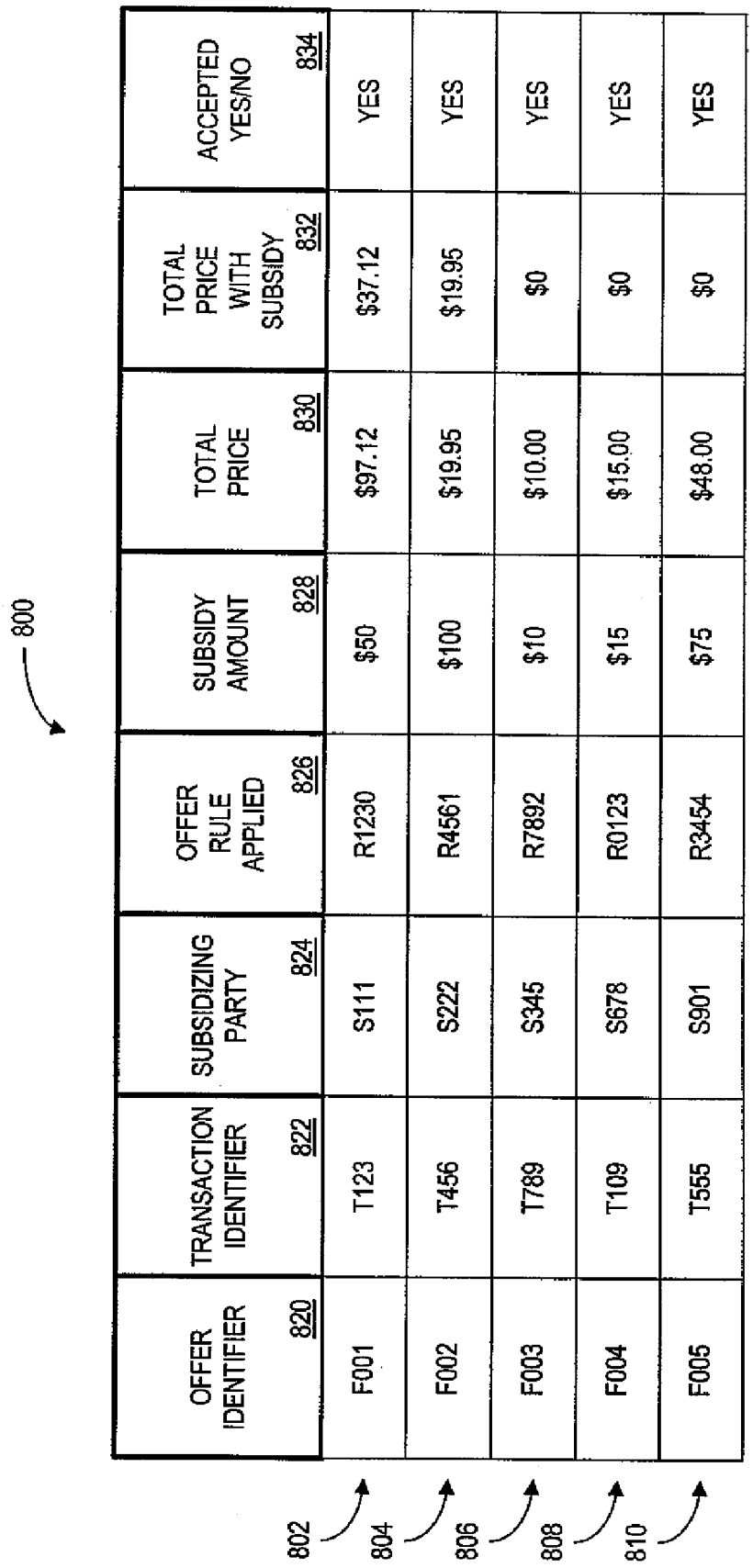
FIG. 8 is a representation of an offers database of the merchant server of FIG. 2.

Referring to FIG. 8, a table 800 represents an embodiment of the offers database 280 (FIG. 2). The table 800 includes entries 802, 804, 806, 808 and 810, each defining an offer for a subsidy. The offer was provided to a customer during a transaction of the customer with the merchant. Those skilled in the art will understand that the table 800 may include any number of entries. The table 800 also defines fields for each of the entries 802, 804, 806, 808 and 810. The fields specify (i) an offer identifier 820 that uniquely identifies the offer, (ii) a transaction identifier 822 that uniquely identifies the transaction during which the offer was provided, (iii) a subsidizing party identifier 824 that uniquely identifies the subsidizing party, (iv) an identifier of an offer rule 826 that was satisfied during the transaction, (v) a subsidy amount 828, (vi) a total price 830 that the customer would have to pay without the subsidy, (vii) a total price 832 that the customer would have to pay with the subsidy, and (viii) whether the offer was accepted 834. As described above with reference to FIG. 7, offer rules define specific subsidies. Thus, the identifier of an offer rule stored in field 826 may be used to determine a corresponding subsidy amount.

Referring to FIG. 9, a table 900 represents a record of an embodiment of the offer summary database 290 (FIG. 2). The offer summary database 290 typically includes a plurality of records, each defining a summary of offers for subsidies that have been provided on behalf of a subsidizing party. The table 900 includes a subsidizing party identifier 902 that uniquely identifies the subsidizing party, a total number of offers provided 904 on behalf of the subsidizing party, a total number of those offers that were accepted 906, and a total amount 908 of the subsidies due in connection with accepted offers.

The table 900 also includes entries 910 and 912, each defining offers provided due to satisfaction of an offer rule of the subsidizing party. Those skilled in the art will understand that the table 900 may include any number of entries. The table 900 also defines fields for each of the entries 910 and 912. The fields specify (i) an offer rule identifier 920 that uniquely identifies the offer rule, (ii) a number 922 of offers provided due to the offer rule, (iii) a number 924 of these offers that were accepted, (iv) an amount 926 of the subsidies due in connection with these accepted offers.

Figure 10:
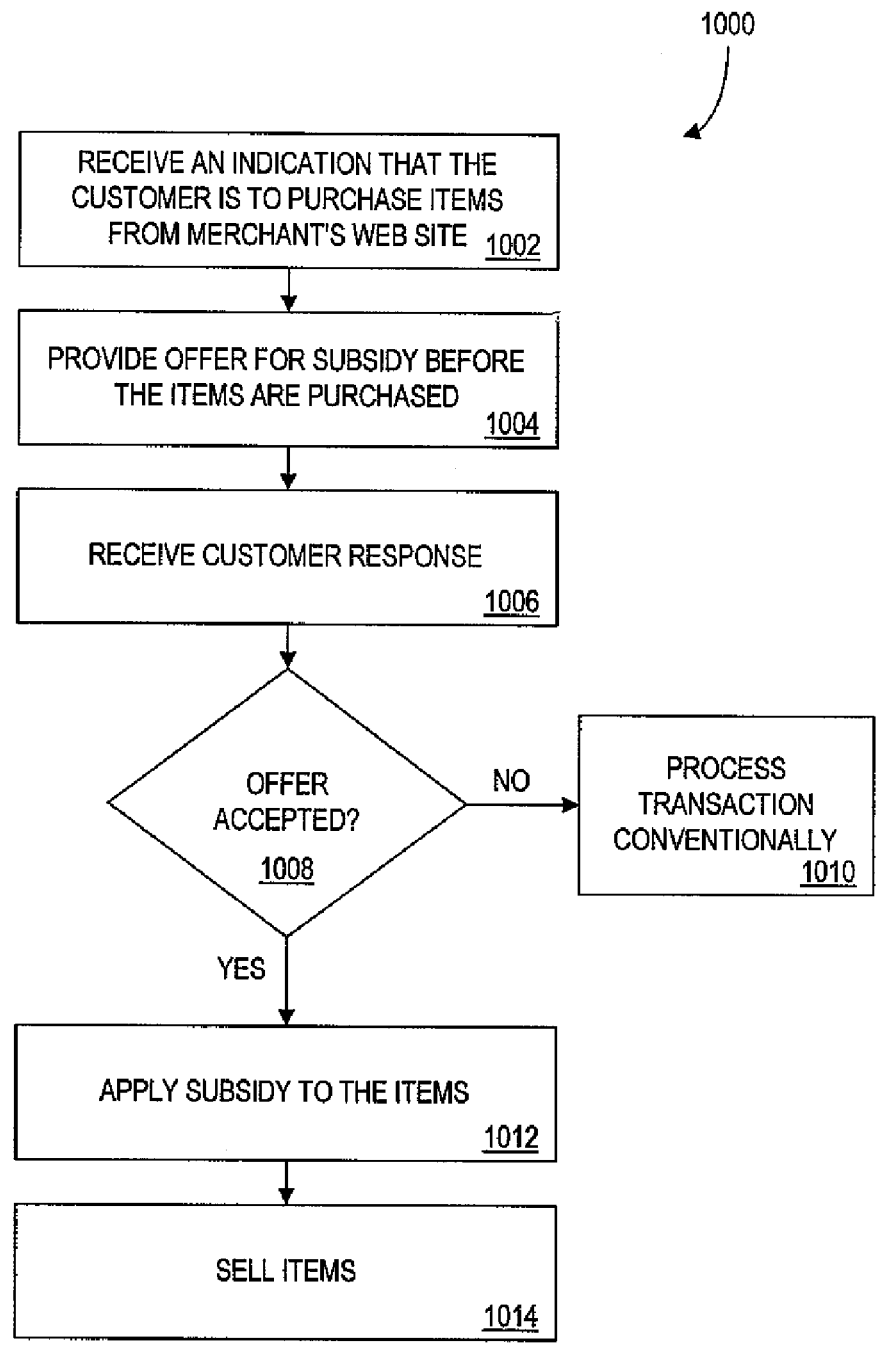
FIG. 10 is a flow chart illustrating an embodiment of a method for providing an offer for a benefit to a customer that is to purchase items from a merchant.

Referring to FIG. 10, a flow chart 1000 illustrates an embodiment of a method for providing an offer for a benefit to a customer that is to purchase items from a merchant. In one embodiment, the illustrated method is performed by the merchant server 110 after the customer has accessed a web page generated and/or controlled by the merchant server 110.

The merchant server 110 receives an indication that the customer is to purchase items from the web site of the merchant (step 1002). For example, after a customer accesses the web site, the customer may select one or more items to purchase, and "click" a button that indicates that the customer desires to purchase the selected items. The act of clicking could generate a signal that the merchant server 110 interprets as an indication that the customer is to purchase the selected items. In another embodiment, the act of accessing the web site could generate a signal that the merchant server 110 interprets as an indication that the customer is to purchase the selected items. Those skilled in the art will understand still other types of appropriate indications.

Before the customer purchases the items, the merchant server 110 provides the customer with an offer for a subsidy (step 1004). For example, the web page may display text describing the subsidy. In one embodiment, the web page may be dynamically modified to include a button that, when clicked, indicates acceptance of an offer for a subsidy. Alternatively, the offer may be transmitted to the customer via email or other means.

A response to the offer is received from the customer (step 1006). For example, the customer may click a button on the web page or click on a hyperlink on the web page. If it is determined that the offer is not accepted (step 1008), then the transaction is processed conventionally (step 1010). For example, the items are purchased for the conventional total price, and a credit card account of the customer is charged appropriately.

If it is determined that the offer is accepted (step 1008), then the subsidy is applied to the items (step 1012) and the items are sold to the customer with the benefit of the subsidy (step 1014).

Figure 11:
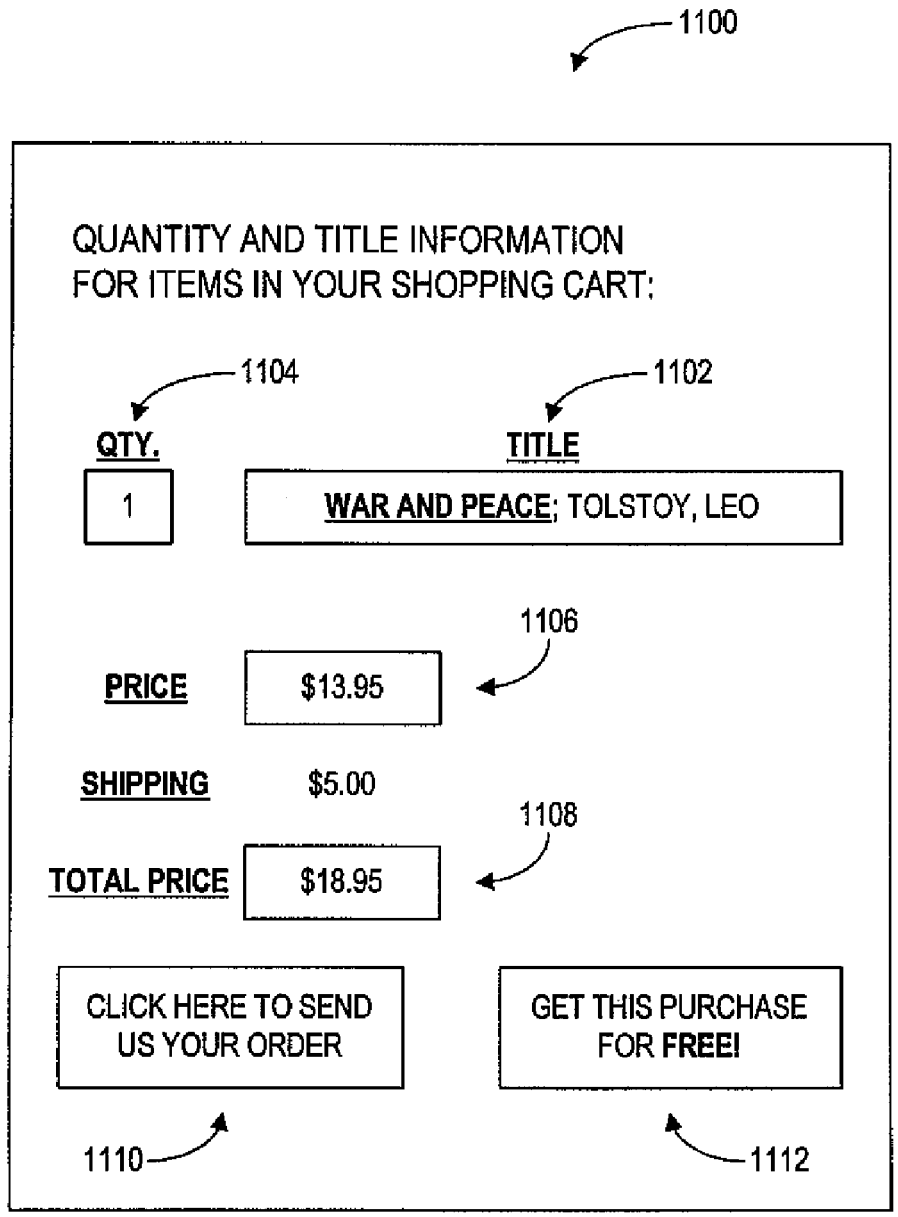
FIG. 11 is an exemplary web page.

Referring to FIG. 11, an exemplary web page 1100 illustrates a possible means for providing an offer for a benefit and receiving an acceptance of the offer. The web page 1100 illustrates an embodiment in which the merchant sells books via the World Wide Web.

A book that the customer is ready to purchase is indicated by text 1102, and a quantity of that book (one book in FIG. 11) is indicated by text 1104. A price of the books is indicated by text 1106, and similarly a total price (e.g. the sum of item prices and any other prices) due from the customer is indicated by text 1108.

A button 1110 is clicked by the customer if the customer desires to purchase the specified items and thereby consummate the purchase. Upon clicking the button 1110, the items may be immediately deemed as having been purchased by the customer. A button 1112 is clicked by the customer if the customer desires to accept an offer for a subsidy. Alternatively, actuating the button 1112 may indicate that the customer is interested in further information regarding an offer for a subsidy, and the customer may subsequently indicate whether he accepts the offer.

Figure 12:
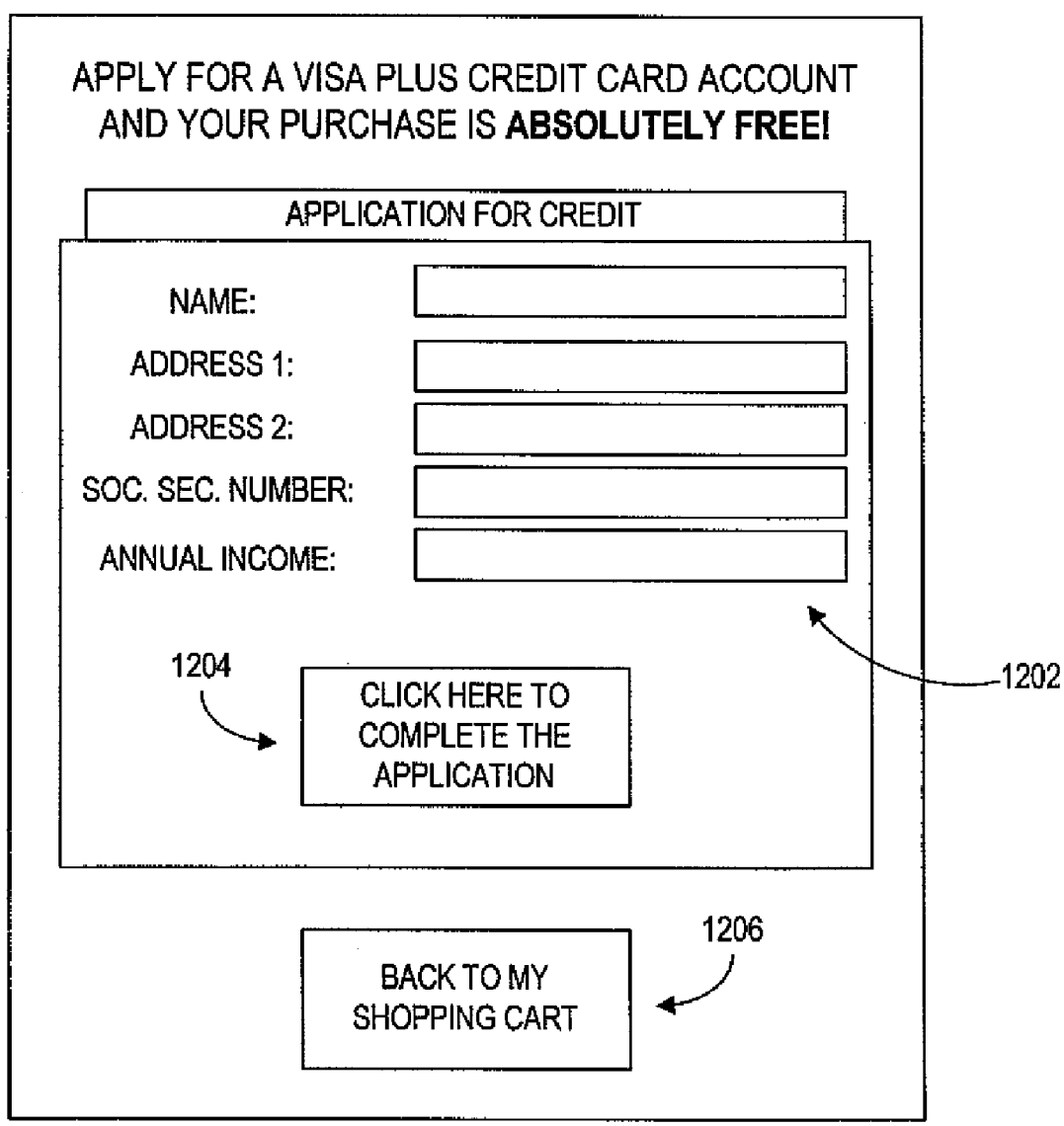
FIG. 12 is another exemplary web page.

Referring to FIG. 12, a second exemplary web page 1200 allows the customer to provide customer information via a form having fields 1202 that receive entered text. The customer information is used in applying for a credit card account with a credit card issuer. In one embodiment, the web page 1200 may be displayed after the customer clicks the button 1110 of FIG. 11. Information that is entered via the web page 1200 may be transmitted to the merchant server 110 upon actuation of a button 1204. Actuation of the button 1204 may furthermore indicate acceptance of the offer for the subsidy. For example, actuation of the button 1204 may indicate a willingness to apply for a credit card account, or that the customer has applied for the credit card account. Conversely, actuation of the button 1206 may indicate rejection of the offer for the subsidy.

Figure 13A:
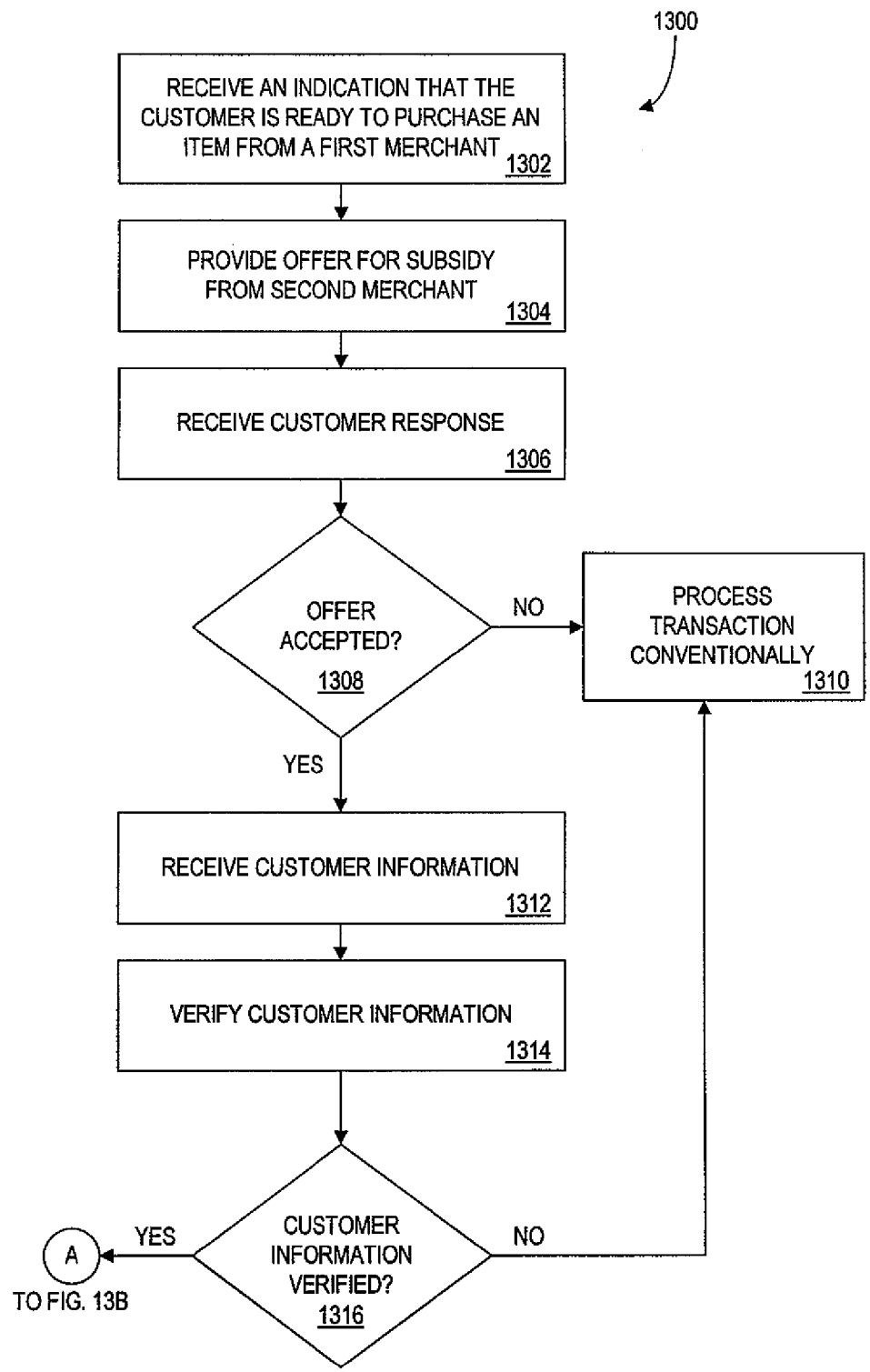
FIGS. 13A and 13B are a flow chart illustrating another embodiment of a method for providing an offer for a benefit to a customer that is to purchase items from a merchant.
Figure 13B:
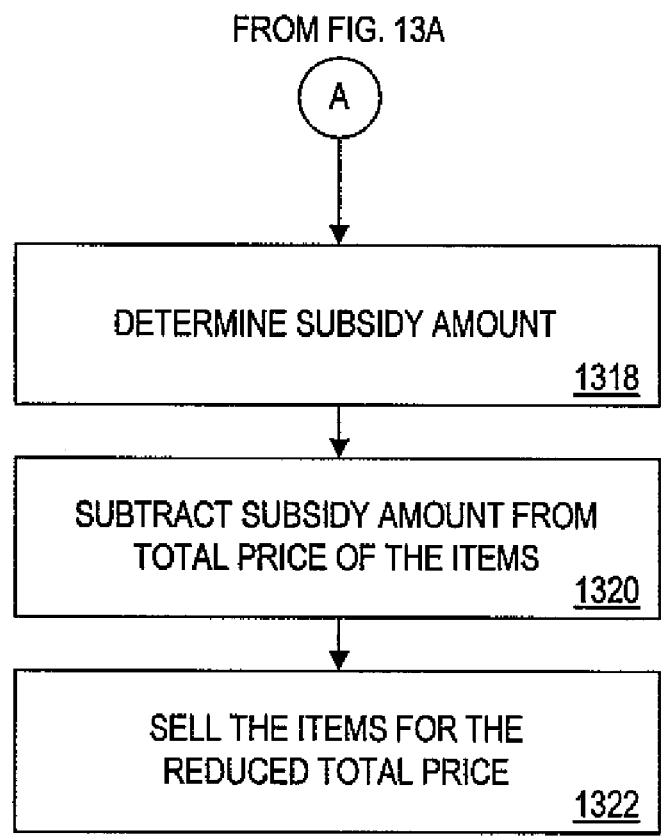

Referring to FIGS. 13A and 13B, a flow chart 1300 illustrates another embodiment of a method for providing an offer for a benefit to a customer that is to purchase items from a merchant. The merchant server 110 receives an indication that the customer is ready to purchase items from the web site of a first merchant (step 1302). A customer may indicate his readiness to purchase by, for example, selecting items to purchase and actuating a specific button that consummates the purchase of the items. Before the customer purchases the items, the merchant server 110 provides the customer with an offer for a subsidy from a second merchant (step 1304). Subsequently, a response from the customer is received (step 1306).

If it is determined that the offer is not accepted (step 1308), then the transaction is processed conventionally (step 1310). If however it is determined that the offer is accepted (step 1308), then customer information is received (step 1312). Such customer information may be used in providing or facilitating an additional transaction that is required of the customer in exchange for the subsidy. In one embodiment described in further detail below, in exchange for the subsidy the customer agrees to initiate a new service agreement, so that a service is provided by the second merchant. Accordingly, the customer information may comprise an indication of a service that is provided to the customer (e.g. whether the customer has cable television service), or a service provider that provides a service to the customer (e.g. which company provides cable television service to the customer). The additional transaction may occur after a significant amount of time has elapsed. Accordingly, in one embodiment there is a means for determining if the future action has occurred.

Furthermore, a penalty may be assessed against the customer if the customer does not perform the required additional transaction. For example, the subsidy to the customer may be canceled and the transaction may then be processed conventionally. Alternatively, a penalty fee may be charged to the customer.

Similarly, a penalty could be assessed if another imposed condition is violated. For example, a penalty could be assessed if the items are purchased and then returned. Accordingly, in such an embodiment a returnable purchase is made a non-returnable purchase in exchange for the subsidy or other benefit.

The customer information may be received from the customer. In one embodiment, the merchant server 10 can request that the customer provide customer information. For example, the merchant server 10 may transmit a form (e.g. via the web site) including questions to be answered. In response, the merchant server would receive answers to the questions, and these answers would constitute the customer information from the customer.

In another embodiment, the customer information may be received from a party other than the customer. For example, information regarding the customer may be received from a third-party database (e.g. a list of addresses to provide a location of the customer). Alternatively, customer information may be received from an ISP (Internet Service Provider), which can provide information such as an Internet address of the customer.

In still another embodiment, the customer information may be received via a "cookie" stored on the customer terminal 120 (FIG. 1). Those skilled in the art will understand that a great variety of data may be stored in such cookies, and information may be stored in the cookie in response to various events such as the web sites that are visited by the customer.

The merchant server 110 may verify whether the customer information is accurate (step 1314). For example, if the information is provided by the customer, it can be advantageous to assure that the customer information is not false. To provide a further incentive for the customer to provide accurate customer information, a penalty may be assessed against the customer if the customer information is not accurate. For example, if it is determined that the customer information is not accurate (step 1316), the subsidy to the customer may be canceled and the transaction is processed conventionally (step 1310). Alternatively, a penalty fee may be charged to the customer if it is determined that the customer information is not accurate. In such an embodiment, it may be further advantageous to verify the customer information before the purchase is consummated. Thus, the threat that the subsidy will not be forthcoming can give the customer an incentive to provide accurate information.

If it is determined that the customer information is accurate (step 1316), then the merchant server 110 determines the amount of the subsidy (step 1318). The subsidy amount is typically stored in the offer rules database 270 (FIG. 2). The subsidy amount may be, for example, a predetermined amount or a predetermined percentage (e.g. a predetermined percentage of the total price). The subsidy amount may also be limited, such that the price charged cannot be lower than zero. For example, a subsidy amount may be "up to $100 off, but no more than the total price".

The subsidy amount is subtracted from the total price of the items (step 1320) and the items are sold for the reduced total price (step 1322). Alternatively, instead of the total price being reduced, a price of one or more items (e.g. items of a certain type or promotional items) may be reduced to provide an incentive to purchase these items. In summary, accepting the subsidy allows the items to be sold to the customer for a lesser price, and the items may even be provided to the customer without charge.

Figure 14A:
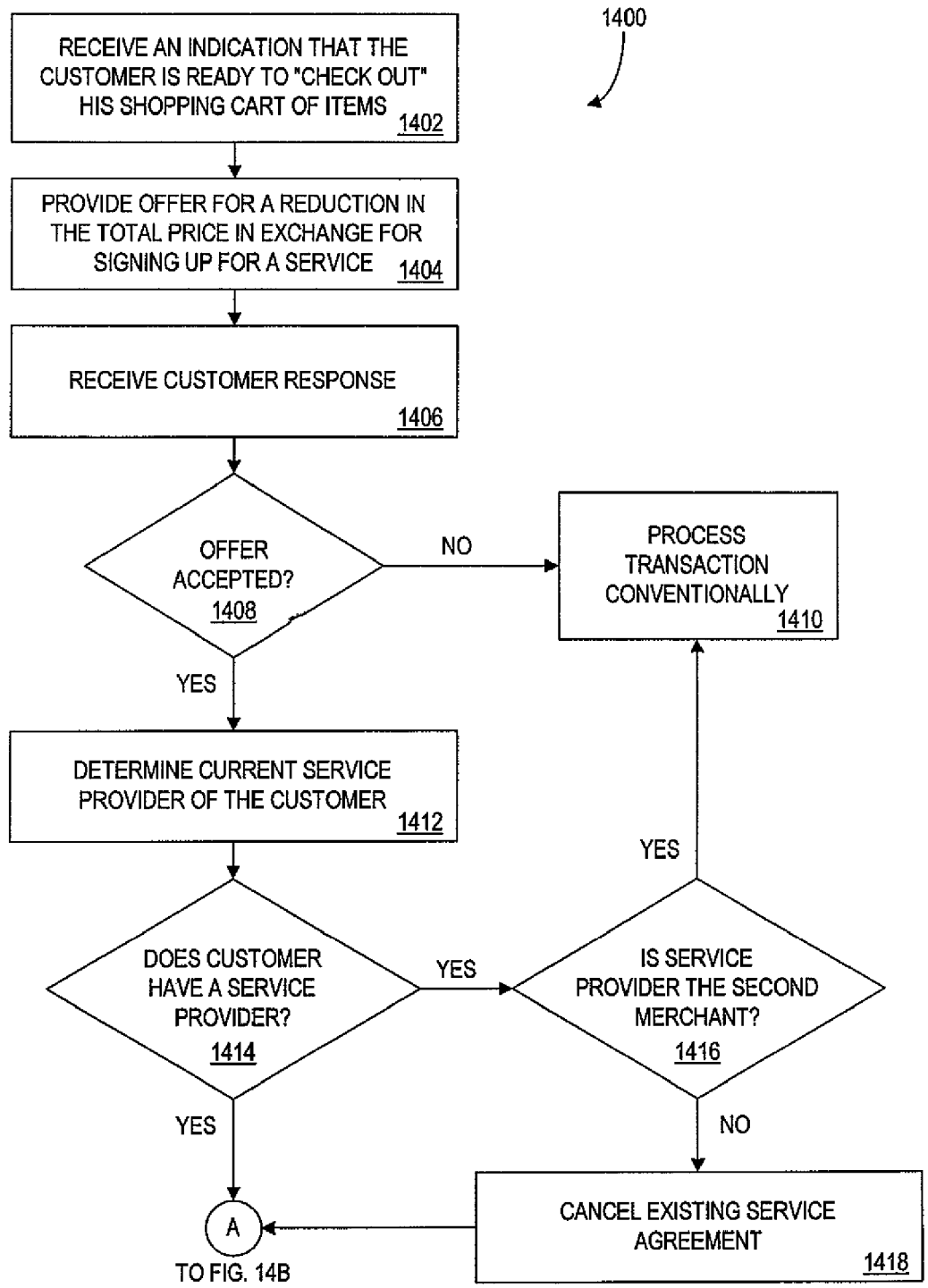
FIGS. 14A and 14B are a flow chart illustrating another embodiment of a method for providing an offer for a benefit to a customer that is to purchase items from a merchant.
Figure 14B:
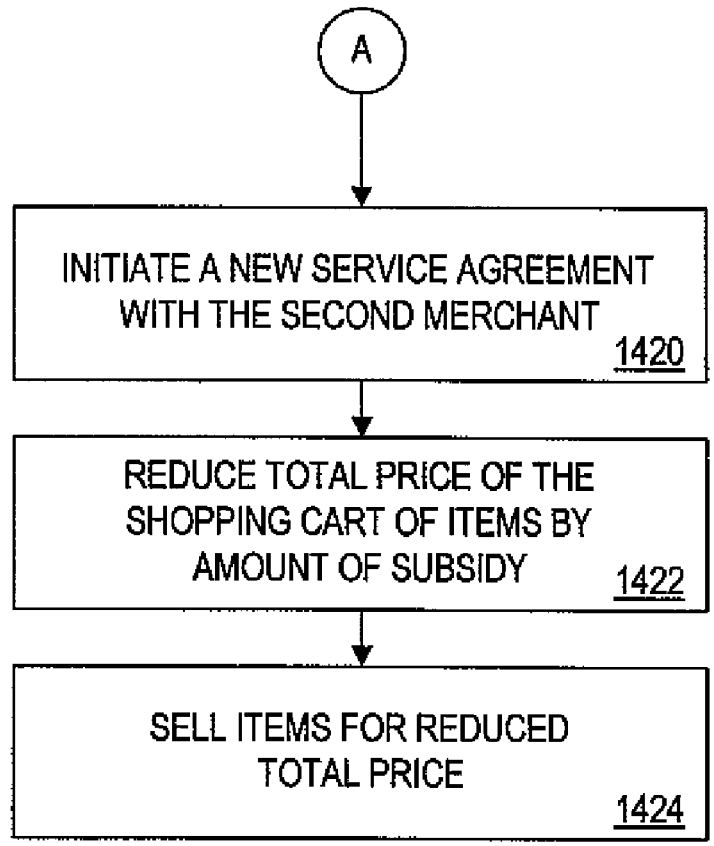

Referring to FIGS. 14A and 14B, a flow chart 1400 illustrates another embodiment of a method for providing an offer for a benefit to a customer that is to purchase items from a first merchant. The merchant server 110 receives a signal indicating that the customer is ready to "check out" his "shopping cart" of items on the web site of the first merchant (step 1402). As is understood by those skilled in the art, a shopping cart of items on a web site defines a set of items the customer desires to purchase. Checking out the shopping cart indicates a desire to proceed with purchasing the selected items.

Before the customer purchases the items, the merchant server 110 provides the customer with an offer for a reduction in the total price in exchange for signing up for a service with a second merchant (step 1404). For example, the service may be telephone service, Internet service, banking services, credit card account services, insurance service, securities trading service, satellite television service, or cable television service. Accordingly, the second merchant would be a provider of such services, and the customer would be requested to participate in a transaction (e.g. initiate a service agreement with) with the second merchant.

Subsequently, a response from the customer is received (step 1406). If it is determined that the offer is not accepted (step 1408), then the transaction is processed conventionally (step 1410). If however it is determined that the offer is accepted (step 1408), then a current service provider of the customer (i.e. a party that provides a specified service to the customer) is determined (step 1412). The customer may be asked to provide information of the current provider, or this information may be determined from other sources. For example, one or more databases may be accessed to determine the long distance telephone service provider of the customer. Alternatively, the second merchant may allow access to a database of its existing customers.

If it is determined that the customer has a service provider (step 1414), and it is determined that the second merchant already provides the customer with the specified service (step 1416), then the transaction is processed conventionally (step 1410). If it is determined that the customer has a service provider (step 1414), but it is determined that the second merchant does not provide the customer with the specified service (step 1416), then the customer must have a service agreement with another service provider. Accordingly, the existing service agreement is canceled (step 1418).

If it is determined that the customer does not have a service provider of the specified service at all (step 1414), (or if the merchant server 110 will cancel or has canceled the existing service agreement) then a new service agreement is initiated with the second merchant (step 1420). Thus, the second merchant has acquired a new customer, either by signing up the customer for a new service or by switching providers of the specified service that is provided to the customer. In exchange, the total price of the shopping cart of items is reduced by the amount of the subsidy (step 1422), and the items are sold for this reduced total price (step 1424).

Figure 15:
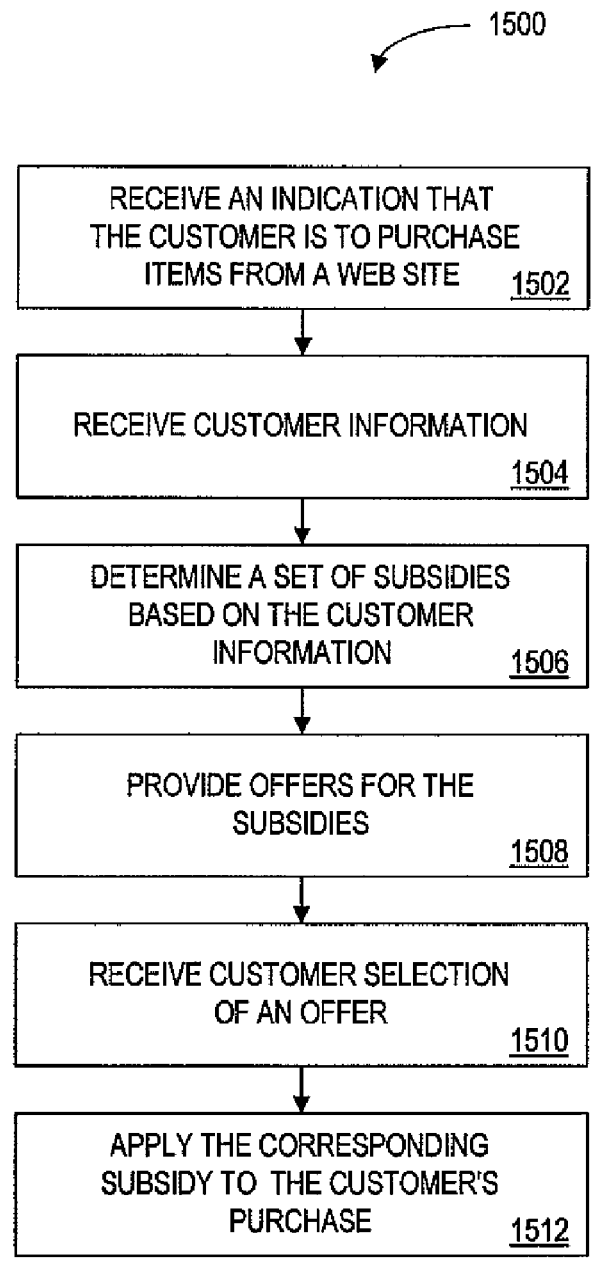
FIG. 15 is a flow chart illustrating another embodiment of a method for providing an offer for a benefit to a customer that is to purchase items from a merchant.

Referring to FIG. 15, a flow chart 1500 illustrates another embodiment of a method for providing an offer for a benefit to a customer that is to purchase items from a first merchant. The merchant server 110 receives an indication that the customer is ready to purchase items from the web site of a first merchant (step 1502). The merchant server 110 may also receive customer information (step 1504), as described above. The customer information may comprise, for example, a location of the customer or a current service provider of the customer.

A set of subsidies for which the customer may be eligible is determined (step 1506). In one embodiment, the set of subsidies is determined based on customer information. For example, upon reference to the customer information, one or more offer rules may be satisfied. The corresponding subsidies would then be included in the set of subsidies. In another embodiment, the offer rules may be satisfied without reference to customer information. For example, an offer rule may be satisfied if the total price of the items (or the price of any of the item) is greater than a predetermined threshold. In yet another embodiment, one or more subsidizing merchants may be contacted, customer information may be transmitted to the subsidizing merchants, and in response the subsidizing merchants may transmit to the merchant server 110 a description of a subsidy to offer.

Offers for each of the subsidies may be provided to the customer (step 1508) for the customer to select one (or more). For example, each offer may be listed on a web page, and the customer must click a hyperlink corresponding to his desired offer. The customer selection is received (step 1510) and the corresponding subsidy is applied to the customer's purchase (step 1512). Alternatively, the customer may be similarly prompted to select a merchant from a plurality of merchants, and the customer would subsequently be provided with an offer for a subsidy from the selected merchant.

Figure 16:
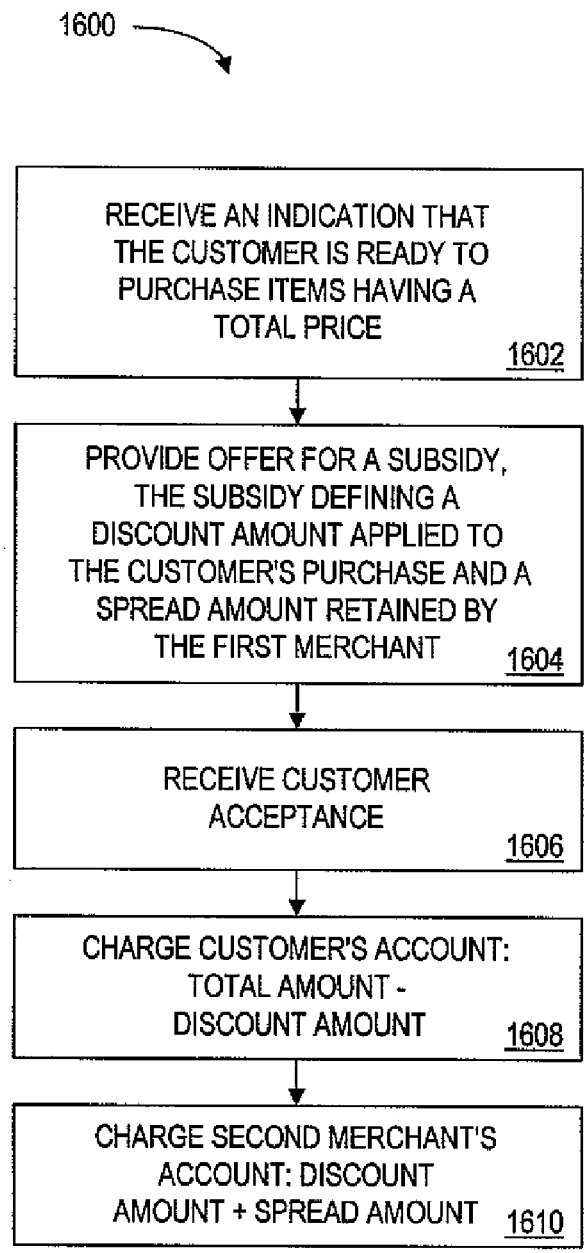
FIG. 16 is a flow chart illustrating another embodiment of a method for providing an offer for a benefit to a customer that is to purchase items from a merchant.

Referring to FIG. 16, a flow chart 1600 illustrates another embodiment of a method for providing an offer for a benefit. In particular, the illustrated flow chart 1600 shows the exchange of payment among the parties. The merchant server 110 receives an indication that the customer is ready to purchase items having a total price (step 1602). In response, the merchant server 110 provides an offer for a subsidy (step 1604). The subsidy defines a discount amount that is applied to the customer's purchase. The subsidy also defines a spread amount that is retained by the first merchant.

Once the customer acceptance is received (step 1606), the customer's account (e.g. a credit card account) is charged by the total amount less the discount amount (step 1608). Similarly, an account of the second merchant is charged by the sum of the discount amount and the spread amount. The second merchant may be charged substantially immediately (e.g.

immediately after the customer accepts). In another embodiment, the customer may be charged at predefined intervals (e.g. once per month).

Although the present invention has been described with respect to a preferred embodiment thereof, those skilled in the art will note that various substitutions may be made to those embodiments described herein without departing from the spirit and scope of the present invention.

What is claimed is:

1. A method, comprising:

receiving an indication of at least one item in a shopping cart that a customer is ready to purchase from a first merchant via a web site;

allowing a second merchant to intervene in the purchase of the at least one item by the customer from the first merchant by providing, in response to the received indication, an offer for a benefit from the second merchant, the step of providing the offer being performed before the at least one item is purchased, in which providing the offer comprises transmitting to the customer a web page including an indication of the at least one item in the shopping cart, an indication of an associated total price for the at least one item, a first selectable web page element associated with a first option for the customer to pay the associated total price for the at least one item, and a second selectable web page element associated with a second option for the customer to receive an offer for a reduction of the associated total price, in which the offer comprises an offer from the second merchant to have the at least one item provided to the customer for an amount less than the associated total price in exchange for the customer agreeing to sign up for a service with the second merchant and in which the service is not one of the at least one item to be purchased from the first merchant, and in which the offer is not provided unless and until the indication of the at least one item that the customer is to purchase from the first merchant is received;

receiving from the customer via the web page a signal indicating selection by the customer of the second selectable web page element; and applying the benefit to the at least one item in response to the received signal, in which applying the benefit comprises selling the at least one item to the customer for a second price, the second price being less than the first price.

2. The method of claim 1, further comprising:
receiving information about the customer.

3. The method of claim 2, in which the information about the customer does not include the indication of the at least one item that the customer is to purchase.

4. The method of claim 2, in which the customer information comprises:
a service that is provided to the customer.

5. The method of claim 2, in which the customer information comprises:
a service provider that provides a service to the customer.

6. The method of claim 2, in which the step of providing an offer for a benefit from a second merchant comprises:
selecting the second merchant from a plurality of merchants based on the customer information received from the customer; and
providing an offer for a benefit from the selected merchant.

7. The method of claim 2, in which the step of providing an offer for a benefit from a second merchant comprises:
selecting the benefit based on the customer information received from the customer.

8. The method of claim 2, in which the step of receiving customer information comprises:
requesting that the customer provide customer information; and
receiving, in response to the step of requesting, customer information from the customer.

9. The method of claim 8, in which the step of requesting that the customer provide customer information comprises:
transmitting to the customer at least one question to be answered.

10. The method of claim 9, in which the step of receiving customer information from the customer comprises:
receiving at least one answer to the at least one question.

11. The method of claim 2, further comprising:
verifying whether the customer information is accurate.

12. The method of claim 11, further comprising:
assessing a penalty against the customer if the customer information is not accurate.

13. The method of claim 12, in which the step of assessing the penalty comprises:
canceling the benefit if the customer information is not accurate.

14. The method of claim 12, in which the step of assessing the penalty comprises:
charging a penalty fee to the customer if the customer information is not accurate.

15. The method of claim 11, in which the step of verifying is performed before the purchase is consummated.

16. The method of claim 2, in which the step of providing the offer is performed after the customer information is received.

17. The method of claim 16, in which the step of providing the offer is performed based on the customer information.

18. The method of claim 1, further comprising:
receiving customer information from a party other than the customer.

19. The method of claim 2, in which the step of receiving customer information comprises:
receiving information regarding at least one of:
a location of the customer, and
an Internet address of the customer.

20. The method of claim 1, in which the second price is a predetermined amount less than the first price.

21. The method of claim 20, in which the second price is a predetermined amount less than the first price if the first price is greater than the predetermined amount.

22. The method of claim 1, in which the second price is a predetermined percentage less than the first price.

23. The method of claim 1, in which the step of applying the benefit comprises:
providing the at least one item to the customer without charge.

24. The method of claim 1, further comprising:
requesting that the customer participate in a transaction with the second merchant.

25. The method of claim 24, in which the step of requesting that the customer participate in a transaction with the second merchant comprises:
requesting that the customer initiate a service agreement with the second merchant.

26. The method of claim 1, further comprising:
receiving an indication of agreement to participate in a transaction with the second merchant.

27. The method of claim 1, further comprising:
facilitating a transaction with the second merchant.

28. The method of claim 27, in which the step of facilitating the transaction with the second merchant comprises:
determining a service provider that provides a service to the customer.

29. The method of claim 28, in which the step of facilitating the transaction with the second merchant comprises:
canceling a service agreement with the service provider.

30. The method of claim 28, in which the step of facilitating the transaction with the second merchant comprises:
initiating a new service agreement so that the service is provided by the second merchant.

31. The method of claim 28, in which the step of determining a service provider that provides a service to the customer comprises:
determining whether the service is provided by the second merchant.

32. The method of claim 27, in which the step of facilitating the transaction with the second merchant comprises:
switching providers of a service that is provided to the customer.

33. The method of claim 32, in which the service is selected from the group consisting essentially of:
telephone service,
Internet service,
banking services,
credit card account services,
insurance service,
securities trading service,
satellite television service, and
cable television service.

34. The method of claim 27, in which the step of facilitating the transaction with the second merchant comprises:
initiating a new service agreement so that a service is provided to the customer.

35. The method of claim 34, in which the service is selected from the group consisting essentially of:
telephone service,
Internet service,
banking services,
credit card account services,
insurance service,
securities trading service,
satellite television service, and
cable television service.

36. The method of claim 1, in which the step of providing an offer is performed only if a price of the at least one item is greater than a predetermined threshold.

37. The method of claim 1, in which the step of providing an offer is performed only if a predetermined rule is satisfied.

38. The method of claim 1, in which the step of providing an offer for a benefit from a second merchant comprises:
providing a plurality of offers for benefits from at least one merchant.

39. The method of claim 38, further comprising:
receiving from the customer a selection of an offer from the provided plurality of offers.

40. The method of claim 1, in which the step of providing an offer for a benefit from a second merchant comprises:
selecting a merchant from a plurality of merchants; and
providing an offer for a benefit from the selected merchant.

41. The method of claim 1, in which the benefit is based on the at least one item.

42. The method of claim 41, in which the benefit is based on a price of the at least one item.

43. The method of claim 1, in which the step of providing an offer for a benefit from a second merchant comprises:
selecting a benefit from a plurality of benefits based on the at least one item.

44. The method of claim 1, further comprising:
receiving an amount of payment from the second merchant.

45. The method of claim 44, in which the benefit is based on the amount of payment.

46. The method of claim 1, in which the second price is zero.

47. A computer readable medium storing instructions configured to direct a computing device to perform a method comprising:
receiving an indication of at least one item in a shopping cart that a customer is ready to purchase from a first merchant via a web site;
allowing a second merchant to intervene in the purchase of the at least one item by the customer from the first merchant by providing, in response to the received indication, an offer for a benefit from the second merchant, the step of providing the offer being performed before the at least one item is purchased,
in which providing the offer comprises transmitting to the customer a web page including
an indication of the at least one item in the shopping cart,
an indication of an associated total price for the at least one item,
a first selectable web page element associated with a first option for the customer to pay the associated total price for the at least one item, and
a second selectable web page element associated with a second option for the customer to receive an offer for a reduction of the associated total price,
in which the offer comprises an offer from the second merchant to have the at least one item provided to the customer for an amount less than the associated total price in exchange for the customer agreeing to sign up for a service with the second merchant, and in which the service is not one of the at least one item to be purchased from the first merchant, and
in which the offer is not provided unless and until the indication of the at least one item that the customer is to purchase from the first merchant is received;
receiving from the customer via the web page a signal indicating selection by the customer of the second selectable web page element; and
applying the benefit to the at least one item in response to the received signal, in which applying the benefit comprises selling the at least one item to the customer for a second price, the second price being less than the first price.

48. An apparatus comprising:
a processor; and
a computer readable medium in communication with the processor, the computer readable medium storing instructions configured to direct the processor to perform a method comprising:
receiving an indication of at least one item in a shopping cart that a customer is ready to purchase from a first merchant via a web site;
allowing a second merchant to intervene in the purchase of the at least one item by the customer from the first merchant by providing, in response to the received indication, an offer for a benefit from the second merchant, the step of providing the offer being performed before the at least one item is purchased, in which providing the offer comprises transmitting to the customer a web page including an indication of the at least one item in the shopping cart, an indication of an associated total price for the at least one item, a first selectable web page element associated with a first option for the customer to pay the associated total price for the at least one item, and a second selectable web page element associated with a second option for the customer to receive an offer for a reduction of the associated total price, in which the offer comprises an offer from the second merchant to have the at least one item provided to the customer for an amount less than the associated total price in exchange for the customer agreeing to sign up for a service with the second merchant and in which the service is not one of the at least one item to be purchased from the first merchant, and in which the offer is not provided unless and until the indication of the at least one item that the customer is to purchase from the first merchant is received;

receiving from the customer a signal indicating selection by the customer of the second selectable web page element; and applying the benefit to the at least one item in response to the received signal, in which applying the benefit comprises selling the at least one item to the customer for a second price, the second price being less than the first price.

* * * * *